United States Patent
Nakagawa et al.

(10) Patent No.: US 9,620,804 B2
(45) Date of Patent: Apr. 11, 2017

(54) FUEL CELL AND METHOD FOR MANUFACTURING THE SAME, ELECTRONIC APPARATUS, ENZYME-IMMOBILIZED ELECTRODE AND METHOD FOR MANUFACTURING THE SAME, WATER-REPELLENT AGENT, AND ENZYME-IMMOBILIZING MATERIAL

(75) Inventors: Takaaki Nakagawa, Kanagawa (JP); Hideyuki Kumita, Kanagawa (JP); Masaya Kakuta, Kanagawa (JP); Hideki Sakai, Kanagawa (JP); Hiroki Mita, Kanagawa (JP); Yoshio Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 13/003,327

(22) PCT Filed: Jun. 1, 2009

(86) PCT No.: PCT/JP2009/059974
§ 371 (c)(1),
(2), (4) Date: Feb. 25, 2011

(87) PCT Pub. No.: WO2010/007833
PCT Pub. Date: Jan. 21, 2010

(65) Prior Publication Data
US 2011/0143225 A1    Jun. 16, 2011

(30) Foreign Application Priority Data
Jul. 14, 2008   (JP) .............................. P2008-182221

(51) Int. Cl.
*H01M 8/02*   (2016.01)
*H01M 8/04*   (2016.01)
(Continued)

(52) U.S. Cl.
CPC ........... *H01M 8/16* (2013.01); *H01M 4/8605* (2013.01); *H01M 4/8892* (2013.01); *H01M 4/90* (2013.01);
(Continued)

(58) Field of Classification Search
CPC .... H01M 8/16; H01M 4/8605; H01M 4/8892; H01M 4/90
(Continued)

(56) References Cited

U.S. PATENT DOCUMENTS 4,970,145 A    11/1990   Bennetto et al.
5,364,711 A    11/1994   Yamada et al.
(Continued)

FOREIGN PATENT DOCUMENTS

JP    63057688 A   *  3/1988
JP    63-307350       12/1988
(Continued)

OTHER PUBLICATIONS

Watanabe et al., English language abstract of JP 63-057688 A, Mar. 1988.*
(Continued)

*Primary Examiner* — Sean P Cullen
(74) *Attorney, Agent, or Firm* — K&L Gates LLP

(57) ABSTRACT

A fuel cell is provided having a structure in which a cathode and an anode face each other with an electrolyte layer therebetween. The cathode includes an electrode on which an oxygen reductase and the like are immobilized, and the electrode has pores therein, water repellency is imparted to at least part of the surface of the electrode. Water repellency is imparted by forming a water-repellent agent on the surface of the electrode. The water-repellent agent includes a water-repellent material such as carbon powder and an organic solvent such as methyl isobutyl ketone that causes phase
(Continued)

separation with water. When the electrode has pores therein, there are provided a fuel cell that stably provides a high current value and a method for manufacturing the fuel cell.

18 Claims, 23 Drawing Sheets

(51) Int. Cl.
    *H01M 8/16*     (2006.01)
    *H01M 4/86*     (2006.01)
    *H01M 4/88*     (2006.01)
    *H01M 4/90*     (2006.01)
    H01M 8/04119     (2016.01)

(52) U.S. Cl.
    CPC   *H01M 8/04119* (2013.01); *H01M 2004/8689* (2013.01); *Y02E 60/527* (2013.01); *Y02P 70/56* (2015.11)

(58) Field of Classification Search
    USPC ................ 429/401, 517, 521, 523, 530, 534
    See application file for complete search history.

(56) References Cited

U.S. PATENT DOCUMENTS

| | | | |
|---|---|---|---|
| 5,432,023 | A | 7/1995 | Yamada et al. |
| 5,441,822 | A * | 8/1995 | Yamashita ............ H01M 4/926 |
| | | | 429/508 |
| 2005/0130025 | A1 | 6/2005 | Kadowaki et al. |
| 2006/0105418 | A1 * | 5/2006 | Sato et al. ...................... 435/25 |
| 2010/0248042 | A1 | 9/2010 | Nakagawa et al. |

FOREIGN PATENT DOCUMENTS

| | | |
|---|---|---|
| JP | 06-188008 | 7/1994 |
| JP | 2000-133297 | 5/2000 |
| JP | 2001-23647 | 1/2001 |
| JP | 2003-077494 | 3/2003 |
| JP | 2003-208905 | 7/2003 |
| JP | 2003-282124 | 10/2003 |
| JP | 2004-071559 | 3/2004 |
| JP | 2004-207208 | 7/2004 |
| JP | 2004-293697 | 10/2004 |
| JP | 2005-013210 | 1/2005 |
| JP | 2005-285549 | 10/2005 |
| JP | 2005-310613 | 11/2005 |
| JP | 2006-024555 | 1/2006 |
| JP | 2006-049215 | 2/2006 |
| JP | 2006-066198 | 3/2006 |
| JP | 2006-093090 | 4/2006 |
| JP | 2006-127957 | 5/2006 |
| JP | 2006-156354 | 6/2006 |
| JP | 2007-012281 | 1/2007 |
| JP | 2007-035437 | 2/2007 |
| JP | 2007-042560 | 2/2007 |
| JP | 2007-087627 | 4/2007 |
| JP | 2007-218795 | 8/2007 |
| JP | 2007-257983 | 10/2007 |
| JP | 2007-280944 | 10/2007 |
| WO | 2009/072564 | 6/2009 |

OTHER PUBLICATIONS

Endo et al., Machine translation of JP 2001-023647 A, Jan. 2001.*
Hatakeyama et al., Partial human translation of JP 2007-257983 A, Oct. 2007.*
International Search Report dated Aug. 4, 2009, for corresponding Patent Application PCT/JP2009/059974.
Japanese Office Action issued Jun. 11, 2013 for corresponding Japanese Appln. No. 2008-182221.
The State Intellectual Property Office of P.R.C., Notification of the Second Office Action, issued in connection with Chinese Patent Application No. 200980126243.7, dated Jul. 11, 2013. (14 pages).
Japanese Patent Office, Notice of refusal issued in connection with Japanese Patent Application No. 2008-182221, dated Sep. 10, 2013. (3 pages).

* cited by examiner

FIG. 27
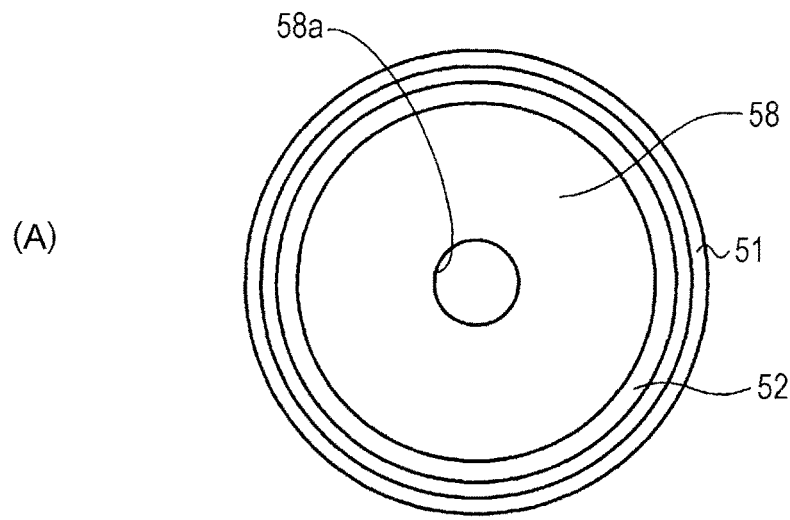
(A)
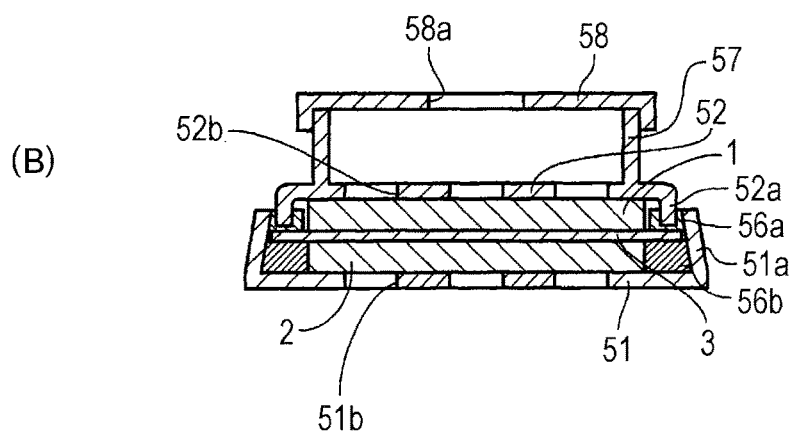
(B)
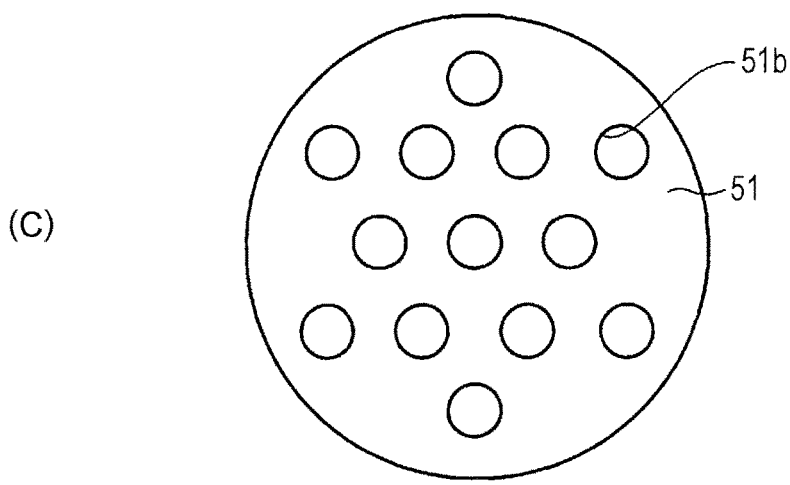
(C)

FUEL CELL AND METHOD FOR MANUFACTURING THE SAME, ELECTRONIC APPARATUS, ENZYME-IMMOBILIZED ELECTRODE AND METHOD FOR MANUFACTURING THE SAME, WATER-REPELLENT AGENT, AND ENZYME-IMMOBILIZING MATERIAL

CROSS REFERENCE TO RELATED APPLICATIONS

The present application is a National Stage of International Application No. PCT/JP2009/059974 filed on Jun. 1, 2009 and which claims priority to Japanese Patent Application No. 2008-182221 filed on Jul. 14, 2008, the entire contents of which are being incorporated herein by reference.

BACKGROUND

The present disclosure relates to a fuel cell and a method for manufacturing the same, an electronic apparatus, an enzyme-immobilized electrode and a method for manufacturing the same, a water repellent agent, and an enzyme-immobilizing material. In particular, the present disclosure is suitably applied to a biofuel cell that uses an enzyme and various electronic apparatuses that use the biofuel cell as a power source.

Fuel cells have a structure in which the cathode (oxidizer electrode) and the anode (fuel electrode) face each other with an electrolyte (proton conductor) therebetween. In conventional fuel cells, the fuel (hydrogen) supplied to the anode is oxidized and separated into electrons and protons ($H^+$); the electrons are delivered to the anode; and $H^+$ moves through the electrolyte to the cathode. At the cathode, the $H^+$ reacts with oxygen supplied from the outside and electrons transmitted from the anode through an external circuit to generate water ($H_2O$).

As described above, fuel cells are highly efficient power-generating devices that convert the chemical energy possessed by a fuel directly into electrical energy, and are capable of extracting the chemical energy possessed by fossil energy, such as natural gas, petroleum, or coal, as electrical energy with high conversion efficiency regardless of the place of use or time of use. Therefore, conventionally, research and development have been actively carried out on fuel cells for application to large-scale power generation, etc. For example, it has been proved that fuel cells installed in space shuttles are capable of supplying electrical power as well as water for the crew and that fuel cells are clean power-generating devices.

Furthermore, in recent years, fuel cells, such as solid polymer fuel cells, that have a relatively low operating temperature range from room temperature to about 90° C., have been developed and have been receiving attention. Therefore, not only application to large-scale power generation, but also application to small systems such as power sources for running automobiles and portable power sources for personal computers and mobile devices has been sought after.

As described above, fuel cells are believed to have a wide range of applications from large-scale power generation to small-scale power generation, and have been receiving much attention as highly efficient power-generating devices. However, in fuel cells, natural gas, petroleum, coal, or the like is normally converted into hydrogen gas using a reformer, and the hydrogen gas is used as a fuel, which poses various problems in that limited resources are consumed and fuel cells need to be heated to high temperature and require a catalyst composed of an expensive noble metal such as platinum (Pt). Furthermore, even in the case where hydrogen gas or methanol is directly used as a fuel, the handling thereof requires care.

Under these circumstances, focusing on the fact that the biological metabolism that takes place in living things is a highly efficient energy conversion mechanism, the application of biological metabolism to a fuel cell has been proposed. Herein, biological metabolism includes respiration, photosynthesis, and the like taking place in microorganism cells. Biological metabolism has a characteristic in that its power generation efficiency is very high and the reaction proceeds under mild conditions such as at about room temperature.

For example, respiration is a mechanism with which nutrients such as saccharides, fats, and proteins are taken into microorganisms or cells; the chemical energy thereof is converted into oxidation-reduction energy, i.e., electrical energy by reducing nicotinamide adenine dinucleotide ($NAD^+$) to reduced nicotinamide adenine dinucleotide (NADH) in the process of generating carbon dioxide ($CO_2$) through a glycolytic pathway and a citric acid (TCA) cycle including many enzyme reaction steps; and in an electron transport system, the electrical energy of the NADH is directly converted into the electrical energy of a proton gradient, and also oxygen is reduced to generate water. The electrical energy obtained here generates, through an adenosine triphosphate (ATP) synthase, ATP from adenosine diphosphate (ADP). The ATP is used for reactions required for the growth of microorganisms and cells. Such energy conversion takes place in cytosol and mitochondria.

Furthermore, photosynthesis is a mechanism with which, in the process of taking in light energy and converting the light energy into electrical energy by reducing nicotinamide adenine dinucleotide phosphate ($NADP^+$) to reduced nicotinamide adenine dinucleotide phosphate (NADPH) through an electron transport system, water is oxidized to generate oxygen. The electrical energy is used for a carbon immobilization reaction in which $CO_2$ is taken in and for synthesis of carbohydrates.

As a technology in which the biological metabolism described above is used for a fuel cell, a microbial cell has been reported, in which electrical energy generated in microorganisms is taken out of the microorganisms through an electron mediator and the electrons are delivered to an electrode to obtain an electric current (e.g., refer to PTL 1).

However, microorganisms and cells include many unnecessary reactions other than target reactions that convert chemical energy into electrical energy. Thus, in the above-described method, electrical energy is consumed in undesired reactions, and sufficient energy conversion efficiency is not achieved.

Under these circumstances, fuel cells (biofuel cells) in which only a desired reaction is carried out using an enzyme have been proposed (e.g., refer to PTLs 2 to 13). In such biofuel cells, a fuel is decomposed by an enzyme and separated into protons and electrons. There have been developed biofuel cells that use, as a fuel, alcohols such as methanol and ethanol or monosaccharides such as glucose.
PTL 1: Japanese Unexamined Patent Application Publication No. 2000-133297
PTL 2: Japanese Unexamined Patent Application Publication No. 2003-282124
PTL 3: Japanese Unexamined Patent Application Publication No. 2004-71559

PTL 4: Japanese Unexamined Patent Application Publication No. 2005-13210
PTL 5: Japanese Unexamined Patent Application Publication No. 2005-310613
PTL 6: Japanese Unexamined Patent Application Publication No. 2006-24555
PTL 7: Japanese Unexamined Patent Application Publication No. 2006-49215
PTL 8: Japanese Unexamined Patent Application Publication No. 2006-93090
PTL 9: Japanese Unexamined Patent Application Publication No. 2006-127957
PTL 10: Japanese Unexamined Patent Application Publication No. 2006
PTL 11: Japanese Unexamined Patent Application Publication No. 2007-12281
PTL 12: Japanese Unexamined Patent Application Publication No. 2007-35437
PTL 13: Japanese Unexamined Patent Application Publication No. 2007-87627

SUMMARY

In general, a material having pores, such as porous carbon, is used as a cathode of the above-mentioned biofuel cells to supply oxygen. However, at the cathode composed of such a material having pores, the pores in the cathode are filled with water that moves from a fuel solution supplied to an anode to a cathode side through an electrolyte, water produced by causing $H^+$ supplied from the anode through the electrolyte to react with oxygen supplied from the outside and electrons sent from the anode through an external circuit, and water exuded by the osmotic pressure from the electrolyte containing a buffer solution. As a result, the inside of the cathode may be submerged in water. When the inside of the cathode is submerged in water in such a manner, it becomes difficult to supply oxygen to the cathode. Thus, a current obtained from the biofuel cell is significantly decreased. Therefore, it is important to control the amount of moisture contained in the cathode, but no effective techniques have been proposed regarding such a control.

Accordingly, it is desirable to provide a fuel cell that can stably provide a high current value by optimizing the amount of moisture contained in a cathode, for example, in the case where the cathode includes an electrode on which an enzyme is immobilized and the electrode has pores therein and a method for manufacturing the fuel cell; an enzyme-immobilized electrode suitably used for the cathode or anode of this fuel cell and a method for manufacturing the enzyme-immobilized electrode; a water-repellent agent suitably used for the enzyme-immobilized electrode; and an enzyme-immobilizing material.

It is desirable to provide an electronic apparatus that uses the excellent fuel cell described above.

Other objects will become apparent in the description of this specification.

In the case where a cathode includes an electrode on which an enzyme is immobilized and the electrode is composed of a material such as porous carbon having pores therein, the amount of moisture contained in the cathode can be maintained in an optimum range by imparting water repellency to at least part of the surface of the electrode that includes the inner surfaces of the pores, and have devised the present invention. Herein, since an enzyme to be immobilized on an electrode and other immobilizing substances generally have high hydrophilicity, it has been very difficult to impart water repellency to the electrode while maintaining such a state. Furthermore, there has been a problem in that, if such a hydrophilic enzyme and other immobilizing substances are immobilized on the electrode subjected to water-repellent treatment, the hydrophobic surface is modified into a hydrophilic surface. In view of the foregoing, the inventors have developed a technique that imparts water repellency to the surface of an electrode while maintaining the activity of an enzyme or the like, the surface including the inner surfaces of pores in the electrode. As a result of further study, the inventors have concluded that this technique that imparts water repellency is effective even in the case where the anode includes an electrode on which an enzyme is immobilized and the electrode is composed of a material such as porous carbon having pores therein.

That is, to solve the above problems, a first embodiment provides a fuel cell having a structure in which a cathode and an anode face each other with a proton conductor therebetween, wherein at least one of the cathode and the anode includes an electrode on which an enzyme is immobilized, the electrode has pores therein, and water repellency is imparted to at least part of a surface of the electrode.

A second embodiment provides a method for manufacturing a fuel cell, wherein when a fuel cell having a structure in which a cathode and an anode face each other with a proton conductor therebetween, at least one of the cathode and the anode including an electrode on which an enzyme is immobilized, the electrode having pores therein, is manufactured, water repellency is imparted to at least part of a surface of the electrode.

The third invention provides an electronic apparatus that uses one or a plurality of fuel cells, wherein at least one of the fuel cells has a structure in which a cathode and an anode face each other with a proton conductor therebetween, at least one of the cathode and the anode includes an electrode on which an enzyme is immobilized, the electrode has pores therein, and water repellency is imparted to at least part of a surface of the electrode.

In the first to third embodiments, in order to impart water repellency to the surface of an electrode of the cathode or the anode, for example, a water-repellent agent containing a water-repellent material is formed on the surface of the electrode. Specifically, for example, the water-repellent agent is applied on the surface of the electrode, the electrode is impregnated with the water-repellent agent, or the electrode is dipped (immersed) in the water-repellent agent. Various water-repellent agents can be used as the water-repellent agent and are selected according to need. For example, a water-repellent agent prepared by dispersing a water-repellent material, particularly a fine particulate water-repellent material, in an organic solvent can be used. The ratio of the water-repellent material in the water-repellent agent may be extremely low. As the water-repellent agent, a water-repellent agent containing at least a water-repellent material and an organic solvent that is separated from water or at least a water-repellent material and an organic solvent in which the solubility of an enzyme is sufficiently low, such as 10 mg/ml or less and preferably 1 mg/ml or less, is preferably used.

Examples of the above organic solvent that can be suitably used include methyl isobutyl ketone, heptane, hexane, toluene, isooctane, and diethyl ether. More generally, various organic solvents such as aliphatic, alicyclic, or aromatic hydrocarbon solvents, ether solvents, and halides of the foregoing solvents can be used. Specific examples of the organic solvent include butane, pentane, hexane, heptane, octane, nonane, decane, dodecane, cyclohexane, cyclopentane, benzene, xylene, butanol, pentanol, methyl ether, ethyl ether, isopropyl ether, methylene chloride, methyl chloroform, carbon tetrachloride, dichlorodifluoromethane, perchloroethylene, and a solvent of benzene or toluene substituted with at least one chlorine atom, bromine atom, and/or iodine atom. The organic solvents are not limited thereto and may be used alone or in combination.

Examples of the organic solvent also include halogenated hydrocarbon solvents such as methylene chloride, 1,2-dichloroethane, chloroform, monochlorobenzene, 1,2-dichlorobenzene, 2-chlorotoluene, 3-chlorotoluene, 4-chlorotoluene, 2-chloro-m-xylene, 2-chloro-p-xylene, 4-chloro-o-xylene, 2,3-dichlorotoluene, 2,4-dichlorotoluene, 2,5-dichlorotoluene, 2,6-dichlorotoluene, 3,4-dichlorotoluene, and monofluorobenzene; and hydrocarbon solvents such as nitrobenzene, and benzene. Examples of the organic solvent also include cyclohexane, normal hexane, cyclohexanone, 1-methoxyisopropanol acetate, ethyl acetate, butyl acetate, petroleum ether, and silicon oil.

An ionic liquid can also be used as the organic solvent. For example, the ionic liquid contains at least one anion selected from the group consisting of fluoroalkyl sulfate anions, fluorocycloalkyl sulfate anions, and fluorobenzyl sulfate anions.

In addition to the water-repellent material and the organic solvent, a binder or the like is optionally added to the water-repellent agent. Various binders can be used as the binder, and a binder having high water repellency such as polyvinyl butyral is preferably used. The content of the binder in the water-repellent material is, for example, 0.01 to 10% by weight, but is not limited thereto. In the case where the binder is a material having water repellency, such as polyvinylidene fluoride (PVDF), the binder itself can be used as the water-repellent material.

Various water-repellent materials can be used as the water-repellent material. For example, carbon materials, preferably carbon powder, can be used. Examples of the carbon powder that can be used include graphite such as natural graphite, activated carbon, carbon nanofiber (vapor grown carbon fiber) used as an additive of a lithium-ion battery, and Ketjenblack. A water-repellent polymer can also be used as the water-repellent material. For example, polyvinyl butyral or various fluorine-based polymers can be used as the water-repellent polymer. Examples of the fluorine-based polymers include, but not limited to tetrafluoroethylene-hexafluoropropylene copolymer (FEP), polytetrafluoroethylene (PTFE), polyvinylidene fluoride, tetrafluoroethylene-perfluoroalkyl vinyl ether copolymer, polyvinyl fluoride, perfluoroalkoxy resin, tetrafluoroethylene-ethylene copolymer, polychlorotrifluoroethylene, and polyethersulfone.

In general, a porous material is used as the material that has pores and is used for an electrode of the cathode or the anode. For example, a carbon material such as porous carbon, carbon pellet, carbon felt, or carbon paper is often used, but other materials may also be used.

Typically, after an enzyme is immobilized on the surface of an electrode of the cathode or the anode, water repellency is imparted by forming a water-repellent agent containing a water-repellent material on a surface of the electrode. As described above, it has been extremely difficult to impart water repellency to the surface of the electrode while maintaining the activity of an enzyme immobilized on the surface of the electrode.

This fuel cell is configured, for example, so that a fuel solution is brought into contact with part of the cathode or so that a fuel solution is brought into contact with the outer peripheral surface of the anode and the side surface of the cathode. However, the configuration is not limited thereto. In the case of the latter, for example, a sheet composed of a material that passes air but does not pass a fuel solution is disposed on a surface of the cathode, the surface being opposite the proton conductor.

Various enzymes can be used as the enzymes immobilized on the cathode and the anode, and the enzymes are selected according to need. In addition, in the case where enzymes are immobilized on the cathode and the anode, preferably, an electron mediator is immobilized in addition to the enzymes.

The enzyme immobilized on the cathode typically includes an oxygen reductase. For example, a bilirubin oxidase, a laccase, an ascorbic acid oxidase, or the like can be used as the oxygen reductase. In this case, in addition to the enzyme, an electron mediator is preferably immobilized on the cathode. As the electron mediator, for example, potassium hexacyanoferrate, potassium ferricyanide, potassium octacyanotungstate, or the like is used. The electron mediator is preferably immobilized at a sufficiently high concentration of, for example, $0.64 \times 10^{-6}$ mol/mm$^2$ or more on average.

For example, in the case where a monosaccharide such as glucose is used as a fuel, the enzyme immobilized on the anode includes an oxidase that facilitates the oxidation of the monosaccharide and decomposes the monosaccharide. In general, in addition to this, the enzyme includes a coenzyme oxidase that returns a coenzyme reduced by the oxidase to an oxidized form. Electrons are produced when the coenzyme is returned to the oxidized form through the action of this coenzyme oxidase, and the electrons are delivered from the coenzyme oxidase to an electrode through an electron mediator. For example, NAD$^+$-dependent glucose dehydrogenase (GDH) is used as the oxidase. For example, nicotinamide adenine dinucleotide (NAD$^+$) is used as the coenzyme. For example, diaphorase is used as the coenzyme oxidase.

In the case where polysaccharides (referring to polysaccharides in a broad sense and referring to all carbohydrates that produce two or more molecules of monosaccharides through hydrolysis, and including oligosaccharides such as disaccharides, trisaccharides, and tetrasaccharides) are used as a fuel, preferably, a catabolic enzyme that facilitates the decomposition, e.g., hydrolysis of polysaccharides and produces monosaccharides such as glucose is also immobilized in addition to the above-described oxidase, coenzyme oxidase, coenzyme, and electron mediator. Specific examples of the polysaccharides include starch, amylose, amylopectin, glycogen, cellulose, maltose, sucrose, and lactose. These are composed of two or more monosaccharides bonded together, and all polysaccharides include glucose as a monosaccharide of a bonding unit. Note that amylose and amylopectin are components contained in starch, and starch is a mixture of amylose and amylopectin. In the case where glucoamylase is used as a catabolic enzyme for polysaccharides and glucose dehydrogenase is used as an oxidase for decomposing monosaccharides, power generation can be performed by using a fuel containing a polysaccharide that can be decomposed to glucose by glucoamylase, for example, any one of starch, amylose, amylopectin, glycogen, and maltose. Note that glucoamylase is a catabolic enzyme that hydrolyzes α-glucan such as starch to produce glucose and glucose dehydrogenase is an oxidase that oxidizes β-D-glucose to D-glucono-δ-lactone. In a preferable configuration, the catabolic enzyme for decomposing a polysaccharide is also immobilized on the anode and a polysaccharide that ultimately functions as a fuel is also immobilized on the anode.

Moreover, in the case where starch is used as a fuel, a solidified gel fuel produced by gelatinizing starch can also be used. In this case, preferably, a method in which gelatinized starch is brought into contact with an anode on which an enzyme and the like have been immobilized or is immobilized on an anode together with an enzyme and the like may be employed. If such an electrode is used, the starch concentration on the surface of the anode can be kept at a level higher than that in the case where starch dissolved in a solution is used, and the rate of decomposition reaction caused by the enzyme is increased to improve the output. In addition, the handling of the fuel is easier than that in the case of a solution and thus a fuel supply system can be simplified. Furthermore, inhibition of turnover of the fuel cell is not necessary and thus it is very advantageous to use the fuel cell in mobile devices, for example.

Any electron mediator may be basically used, and a compound having a quinone skeleton, particularly a compound having a naphthoquinone skeleton, is preferably used. Various naphthoquinone derivatives can be used as the compound having a naphthoquinone skeleton. Specific examples of the naphthoquinone derivatives include 2-amino-1,4-naphthoquinone (ANQ), 2-amino-3-methyl-1,4-naphthoquinone (AMNQ), 2-methyl-1,4-naphthoquinone (VK3), and 2-amino-3-carboxy-1,4-naphthoquinone (ACNQ). As for the compound having a quinone skeleton, for example, anthraquinone and the derivatives thereof can also be used in addition to the compound having a naphthoquinone skeleton. The electron mediator may optionally contain one type or two or more types of other compounds serving as an electron mediator, in addition to the compound having a quinone skeleton. As for a solvent used when a compound having a quinone skeleton, particularly a compound having a naphthoquinone skeleton, is immobilized on the anode, acetone is preferably used. By using acetone as a solvent in this manner, the solubility of the compound having a quinone skeleton can be increased, and the compound having a quinone skeleton can be efficiently immobilized on the anode. The solvent may optionally contain one type or two or more types of solvents other than acetone.

In an example, 2-methyl-1,4-naphthoquinone (VK3) serving as the electron mediator, reduced nicotinamide adenine dinucleotide (NADH) serving as the coenzyme, glucose dehydrogenase serving as the oxidase, and diaphorase serving as the coenzyme oxidase are immobilized on the anode. Preferably, they are immobilized at a ratio of 1.0 (mol):0.33 to 1.0 (mol):(1.8 to 3.6)×10$^6$ (U):(0.85 to 1.7)×10$^7$ (U). Herein, U (unit) is an index indicating the enzyme activity and represents the degree of reaction of 1 μmol of substrate proceeding per minute at a specific temperature and pH.

Various materials can be used as an immobilizing material to immobilize the enzyme, coenzyme, electron mediator, and the like on the anode and the cathode. Preferably, polyion complexes formed by using a polycation such as poly-L-lysine (PLL) or a salt thereof and a polyanion such as polyacrylic acid (for example, sodium polyacrylate (PAAcNa)) or a salt thereof can be used. The polyion complex can be configured so that the enzyme, coenzyme, electron mediator, and the like are contained therein.

Meanwhile, in the case where electron mediators are immobilized on the cathode and anode of this fuel cell, since the electron mediators usually have a low molecular weight, it is not always easy to completely suppress the elution and to maintain a state in which the electron mediators are immobilized on the cathode and the anode for a long time. Therefore, an electron mediator used in the cathode can be moved to the anode side, whereas an electron mediator used in the anode can be moved to the cathode side. In such a case, a decrease in the output of the fuel cell and a decrease in the capacitance may be caused. In order to solve this problem, it is effective to use an electrolyte having a charge of the same sign as that of an oxidized form or a reduced form of the electron mediator. In this case, a repulsive force is exerted between the charge of the electrolyte and the charge of the oxidized form or the reduced form of the electron mediator. Consequently, the electron mediator is not easily moved to the electrolyte side, thus effectively suppressing the movement of the electron mediator to the opposite side through the electrolyte. Typically, when the electrolyte contains a polymer having a charge of the same sign as that of the oxidized form or the reduced form of the electron mediator, e.g., a polyanion or a polycation, the electrolyte has a charge of the same sign as that of the oxidized form or the reduced form of the electron mediator, but the method is not limited thereto. Other methods may be employed so that the electrolyte has a charge of the same sign as that of the oxidized form or the reduced form of the electron mediator. Specifically, in the case where an oxidized form or a reduced form of an electron mediator used in at least one of the cathode and the anode has a negative charge, the electrolyte is made to contain a polymer having a negative charge, e.g., a polyanion. In the case where an oxidized form or a reduced form of an electron mediator has a positive charge, the electrolyte is made to contain a polymer having a positive charge, e.g., a polycation. As the polyanion, for example, Nafion (trade name, DuPont, USA), which is an ion exchange resin having a fluorine-containing carbon sulfonic acid group, dichromate ion ($Cr_2O_7^{2-}$), paramolybdate ion ($[Mo_7O_{24}]^{6-}$), polyacrylic acid (for example, sodium polyacrylate (PAAcNa)), or the like can be used. As the polycation, for example, poly-L-lysine (PLL) or the like can be used.

Various materials can be used as the proton conductor and the proton conductor is selected according to need. Specific examples thereof include materials formed of cellophane, nonwoven fabric, perfluorocarbon sulfonic acid (PFS)-based resin films, copolymer films of trifluorostyrene derivatives, phosphoric acid-impregnated polybenzimidazole films, aromatic polyether ketone sulfonic acid films, PSSA-PVA (polystyrene sulfonic acid-polyvinyl alcohol copolymer), PSSA-EVOH (polystyrene sulfonic acid-ethylene vinyl alcohol copolymer), and ion exchange resins having a fluorine-containing carbon sulfonic acid group (Nafion (trade name, DuPont, USA)), and the like.

In the case where an electrolyte containing a buffer substance (buffer solution) is used as the proton conductor, in order that a sufficient buffering action can be achieved, a shift of pH from an optimum pH can be sufficiently reduced, and the capacity intrinsic to the enzyme can be satisfactorily exerted even if the number of protons is increased or decreased inside the electrode or in an enzyme-immobilized film by an enzyme reaction that uses protons during a high-output operation, it is effective to specify the concentration of the buffer substance contained in the electrolyte to be 0.2 M or more and 2.5 M or less, preferably 0.2 M or more and 2 M or less, more preferably 0.4 M or more and 2 M or less, and further preferably 0.8 M or more and 1.2 M or less. In general, any buffer substance may be used as long as the substance has a p$K_a$ of 5 or more and 9 or less. Specific examples thereof include dihydrogen phosphate ion ($H_2PO_4^-$), 2-amino-2-hydroxymethyl-1,3-propanediol (abbreviated as Tris), 2-(N-morpholino)ethanesulfonic acid (MES), cacodylic acid, carbonic acid ($H_2CO_3$), hydrogen citrate ion, N-(2-acetamide)iminodiacetic acid (ADA), piperazine-N,N'-bis(2-ethanesulfonic acid) (PIPES), N-(2-acetamido)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesulfonic acid (HEPPS), N-[tris(hydroxymethyl)methyl]glycine (abbreviated as tricine), glycylglycine, and N,N-bis(2-hydroxyethyl) glycine (abbreviated as bicine). Examples of a substance that produces dihydrogen phosphate ion ($H_2PO_4^-$) include sodium dihydrogen phosphate ($NaH_2PO_4$) and potassium dihydrogen phosphate ($KH_2PO_4$). Compounds having an imidazole ring are also preferable as the buffer substance. Specific examples of the compounds having an imidazole ring include imidazole, triazole, pyridine derivatives, bipyridine derivatives, and imidazole derivatives (histidine, 1-methylimidazole, 2-methylimidazole, 4-methylimidazole, 2-ethylimidazole, ethyl imidazole-2-carboxylate, imidazole-2-carboxaldehyde, imidazole-4-carboxylic acid, imidazole-4,5-dicarboxylic acid, imidazol-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole). As the buffer substance, 2-aminoethanol, triethanolamine, TES (N-Tris(hydroxymethyl)methyl-2-aminoethanesulfonic acid), BES (N,N-Bis(2-hydroxyethyl)-2-aminoethanesulfonicacid), or the like may also be used. Preferably, the pH of the electrolyte containing the buffer substance is about 7, but may be any value of 1 to 14 in general. According to need, these buffer substances may also be immobilized on a film on which the enzyme and the electron mediator are immobilized.

The entire structure of this fuel cell is selected according to need. For example, when the fuel cell has a coin-type or button-type structure, preferably, the fuel cell has a structure in which the cathode, the electrolyte, and the anode are accommodated inside a space formed between a cathode current collector having a structure through which an oxidizing agent can pass and an anode current collector having a structure through which a fuel can pass. In this case, typically, the edge of one of the cathode current collector and the anode current collector is caulked to the other of the cathode current collector and the anode current collector with an insulating sealing member therebetween, thereby forming the space for accommodating the cathode, the electrolyte, and the anode. However, the method for forming the space is not limited thereto, and the space may be formed by another processing method according to need. The cathode current collector and the anode current collector are electrically insulated from each other through the insulating sealing member. As the insulating sealing member, typically, a gasket composed of an elastic material such as silicone rubber is used, but the insulating sealing member is not limited thereto. The planar shape of the cathode current collector and the anode current collector may be selected according to need, and is, for example, a circular shape, an elliptical shape, a quadrangular shape, a hexagonal shape, or the like. Typically, the cathode current collector has one or a plurality of oxidizing agent supply ports and the anode current collector has one or a plurality of fuel supply ports, but the configuration is not limited thereto. For example, a material through which an oxidizing agent is permeable may be used as the material for the cathode current collector instead of forming the oxidizing agent supply ports. Similarly, a material through which a fuel is permeable may be used as the material for the anode current collector instead of forming the fuel supply ports. The anode current collector typically includes a fuel storage portion. This fuel storage portion may be provided integrally with the anode current collector or so as to be detachably mountable to the anode current collector. The fuel storage portion typically has a cover for sealing. In this case, a fuel may be injected into the fuel storage portion by removing the cover. The fuel may be injected from, for example, the side surface of the fuel storage portion without using such a cover for sealing. When the fuel storage portion is provided so as to be detachably mountable to the anode current collector, for example, a fuel tank or fuel cartridge filled with a fuel in advance may be attached as the fuel storage portion. The fuel tank or the fuel cartridge may be disposable, but is preferably a fuel tank or cartridge into which a fuel can be charged from the standpoint of effective use of resources. Alternatively, a used fuel tank or fuel cartridge may be exchanged for a fuel tank or fuel cartridge filled with a fuel. Furthermore, for example, the fuel storage portion may be provided in the form of a sealed container having a fuel supply port and a fuel discharge port so that the fuel is continuously supplied to the sealed container from the outside through the supply port, whereby the fuel cell can be continuously used. Alternatively, the fuel cell may be used in a state in which the fuel cell floats on a fuel contained in an open fuel tank so that the anode faces downward and the cathode faces upward, without providing such a fuel storage portion.

This fuel cell may have a structure in which the anode, the electrolyte, the cathode, and the cathode current collector having a structure through which an oxidizing agent is permeable are sequentially disposed around a predetermined central axis, and the anode current collector having a structure through which the fuel is permeable is disposed so as to be electrically connected to the anode. In this fuel cell, the anode may have a cylindrical shape with a circular, elliptical, or polygonal section or a columnar shape with a circular, elliptical, or polygonal section. When the anode has a cylindrical shape, the anode current collector may be disposed on the inner peripheral surface side of the anode, disposed between the anode and the electrolyte, disposed on at least one end face of the anode, or disposed at two or more positions of the forgoing, for example. In addition, the anode may be configured to store the fuel. For example, the anode may be composed of a porous material so that the anode also functions as a fuel storage portion. Alternatively, a columnar fuel storage portion may be disposed on a predetermined central axis. For example, when the anode current collector is disposed on the inner peripheral surface side of the anode, the fuel storage portion may be the space itself surrounded by the anode current collector or a container such as a fuel tank or fuel cartridge provided in that space separately from the anode current collector. This container may be detachably mounted or fixed. The fuel storage portion has, for example, a circular columnar shape, an elliptical columnar shape, a polygonal columnar shape such as a quadrangular or hexagonal columnar shape, or the like, but the shape is not limited thereto. The electrolyte may be formed as a bag-like container so as to wrap the entire anode and anode current collector. In this case, when the fuel storage portion is fully filled with a fuel, the fuel can be brought into contact with the entire anode. In this container, at least a portion sandwiched between the cathode and the anode may be formed of an electrolyte, and other portions may be formed of a material different from the electrolyte. This container may be a sealed container having a supply port and a discharge port of a fuel so that the fuel is continuously supplied from the outside to the container through the supply port, whereby the fuel cell can be continuously used. The anode preferably has a high porosity, for example, a porosity of 60% or more so that the anode can sufficiently store the fuel.

A pellet electrode can be used as the cathode and the anode. The pellet electrode can be formed as follows. For example, a carbon-based material (in particular, preferably a fine powder carbon material having high conductivity and large surface area), specifically, for example, a material imparted with high conductivity such as KB (Ketjenblack) or a functional carbon material such as carbon nanotube, fullerene, or the like, optionally a binder such as polyvinylidene fluoride, the enzyme powder (or enzyme solution), the coenzyme powder (or coenzyme solution), the electron mediator powder (or electron mediator solution), the immobilization polymer powder (or polymer solution), and the like are mixed in an agate mortar or the like. The mixture is appropriately dried, and then pressed into a predetermined shape. The thickness of the pellet electrode (electrode thickness) is also determined according to need, but is, for example, about 50 μm. For example, when a coin-type fuel cell is manufactured, a pellet electrode can be formed by pressing the above-described material for forming a pellet electrode into a circular shape (the diameter of which is, for example, 15 mm, but is not limited thereto and determined according to need) using a tablet machine. When the pellet electrode is formed, the electrode thickness is adjusted to a desired value by controlling the amount of carbon contained in the material for forming a pellet electrode, the pressing pressure, and the like. When the cathode or the anode is inserted into a coin-type cell can, electrical contact is preferably established by, for example, inserting a metal mesh spacer between the cathode or the anode and the cell can.

Instead of the above-described method for manufacturing a pellet electrode, for example, a mixed solution (an aqueous or organic solvent mixed solution) of a carbon-based material, optionally a binder, and enzyme immobilization components (an enzyme, a coenzyme, an electron mediator, a polymer, and the like) may be appropriately applied to a current collector or the like and dried, and the whole may be pressed and then cut into a desired electrode size.

This fuel cell can be used for almost all things that require electrical power regardless of the size. For example, the fuel cell can be used for electronic apparatuses, mobile units (such as automobiles, two-wheeled vehicles, aircraft, rockets, and spacecraft), power units, construction machines, machine tools, power generation systems, cogeneration systems, and the like, and the output, the size, the shape, the type of fuel, and the like are determined in accordance with the usage or the like.

The electronic apparatus may be basically any type of apparatus, and includes both portable-type apparatuses and stationary-type apparatuses. Specific examples thereof include cellular phones, mobile apparatuses, robots, personal computers, game machines, car-mounted apparatuses, household electric appliances, and industrial products.

A fourth embodiment provides
an enzyme-immobilized electrode including an electrode on which an enzyme is immobilized,
wherein water repellency is imparted to at least part of a surface of the electrode.

A fifth embodiment provides
a method for manufacturing an enzyme-immobilized electrode,
wherein when an enzyme-immobilized electrode including an electrode on which an enzyme is immobilized is manufactured, water repellency is imparted to at least part of a surface of the electrode.

The enzyme-immobilized electrode according to the fourth and fifth embodiments is suitably applied to a fuel cell in which the cathode includes an electrode on which an enzyme is immobilized and the electrode has pores therein. Typically, after an enzyme is immobilized on the surface of an electrode, water repellency is imparted by forming a water-repellent agent containing a water-repellent material on a surface of the electrode. Specifically, for example, the water-repellent agent is applied on the surface of the electrode, the electrode is impregnated with the water-repellent agent, or the electrode is dipped (immersed) in the water-repellent agent. As described above, it has been extremely difficult to impart water repellency to the surface of the electrode while maintaining the activity of an enzyme immobilized on the surface of the electrode.

The features of the fourth and fifth inventions other than those described above correspond to those described in relation to the first and second inventions as long as the nature thereof is not impaired.

A sixth embodiment provides
a water-repellent agent including at least a water-repellent material and an organic solvent that causes phase separation with water.

A seventh embodiment provides
a water-repellent agent including at least a water-repellent material and an organic solvent in which the solubility of an enzyme is 10 mg/ml or less.

In the water-repellent agents of the sixth and seventh embodiments, for example, the water-repellent material is carbon powder and the organic solvent is methyl isobutyl ketone, heptane, hexane, toluene, isooctane, or diethyl ether.

The features of the sixth and seventh embodiments other than those described above correspond to those described in relation to the first and second embodiments as long as the nature thereof is not impaired.

A eighth embodiment provides
a fuel cell having a structure in which a cathode and an anode face each other with a proton conductor therebetween,
wherein an enzyme is immobilized on at least one of the cathode and the anode, and
an immobilizing material for the enzyme contains a water-repellent material.

A ninth embodiment provides
a method for manufacturing a fuel cell, wherein when a fuel cell is manufactured that has a structure in which a cathode and an anode face each other with a proton conductor therebetween and that has an enzyme immobilized on at least one of the cathode and the anode, the enzyme is immobilized with an immobilizing material containing a water-repellent material.

A tenth embodiment provides
a method for manufacturing a fuel cell, wherein when a fuel cell is manufactured that has a structure in which a cathode and an anode face each other with a proton conductor therebetween and that has an enzyme immobilized on at least one of the cathode and the anode, the enzyme is immobilized on an electrode and then water repellency is imparted by forming a water-repellent agent on a surface of the electrode.

In the tenth embodiment, an immobilizing material may be used to immobilize an enzyme or no immobilizing material may be used. A material containing no water-repellent material is generally used as the immobilizing material, but a material containing a water-repellent material may be optionally used.

An eleventh embodiment provides an enzyme-immobilizing material including at least a water-repellent material and an organic solvent that causes phase separation with water.

The twelfth invention provides an enzyme-immobilizing material including at least a water-repellent material and an organic solvent in which the solubility of an enzyme is 10 mg/ml or less.

The features of the eighth to twelfth embodiments other than those described above correspond to those described in relation to the first and second embodiments as long as the nature thereof is not impaired.

In the first and second embodiments, a nonwoven fabric is exemplified as a proton conductor. It has not been proposed that a nonwoven fabric be used as a proton conductor, which has novelty. Thus, the thirteenth embodiment provides a fuel cell having a structure in which a cathode and an anode face each other with a proton conductor therebetween, wherein an enzyme is immobilized on at least one of the cathode and the anode, and the proton conductor is composed of a nonwoven fabric.

The features of the thirteenth embodiment other than those described above correspond to those described in relation to the first and second embodiments as long as the nature thereof is not impaired.

In the embodiment having the configuration described above, by imparting water repellency to at least part of the surface of an electrode having pores therein, for example, the amount of moisture contained in the cathode can be maintained in an optimum range and an extremely high catalyst current value can be achieved at a cathode. Alternatively, an extremely high catalyst current value can be achieved at an anode.

According to this embodiment, for example, by optimizing the amount of moisture contained in a cathode, a fuel cell that can stably provide a high current value can be realized. Furthermore, by using this excellent fuel cell, a high-performance electronic apparatus or the like can be realized.

Additional features and advantages are described herein, and will be apparent from, the following Detailed Description and the figures.

BRIEF DESCRIPTION OF THE FIGURES

FIG. 27 includes a top view, a sectional view, and a bottom view that show a biofuel cell according to a third embodiment.

DETAILED DESCRIPTION

Embodiments will now be described with reference to the drawings.

Figure 1:
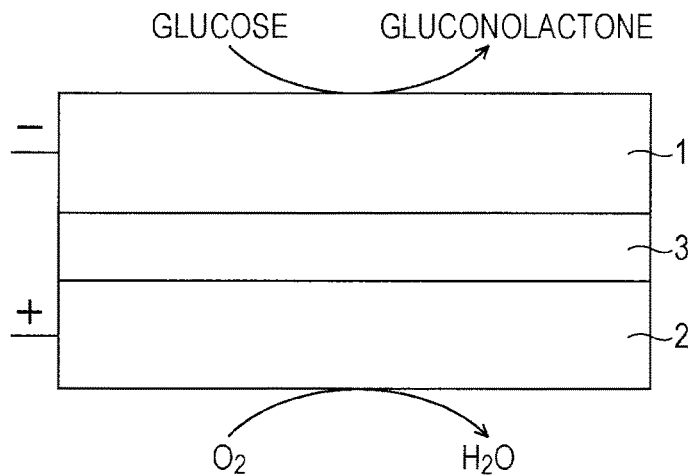
FIG. 1 is a schematic line diagram showing a biofuel cell according to a first embodiment.
Figure 2:
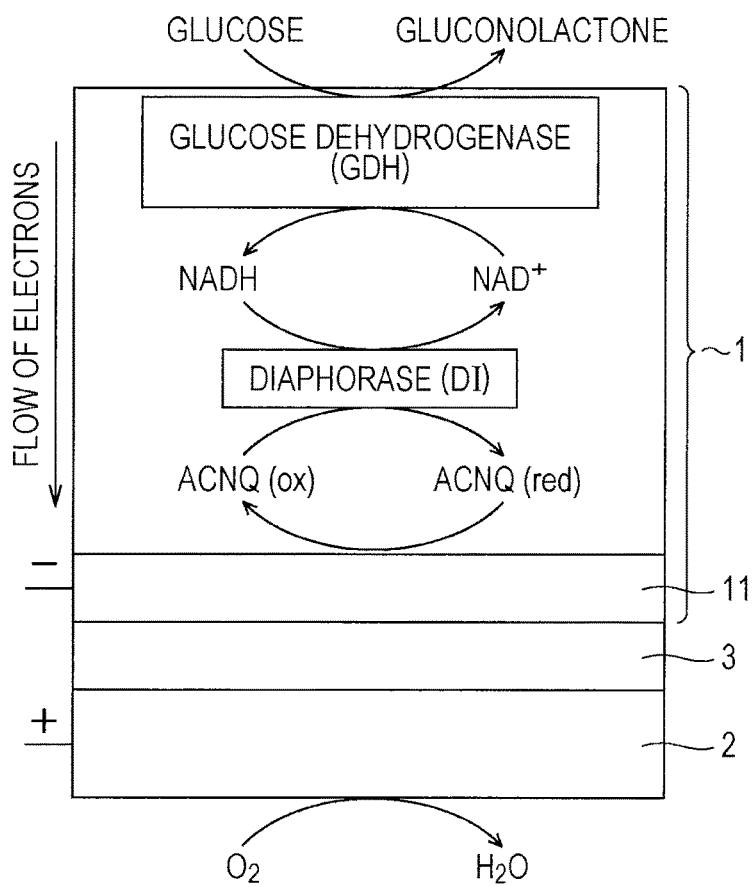
FIG. 2 is a schematic line diagram schematically showing a detailed structure of an anode of the biofuel cell according to the first embodiment, an example of a group of enzymes immobilized on the anode, and an electron transfer reaction performed by the group of enzymes.

FIG. 1 schematically shows a biofuel cell according to a first embodiment. In this biofuel cell, glucose is used as a fuel. FIG. 2 schematically shows a detailed structure of the anode of the biofuel cell, an example of a group of enzymes immobilized on the anode, and an electron transfer reaction performed by the group of enzymes.

As shown in FIG. 1, the biofuel cell has a structure in which an anode 1 and a cathode 2 face each other with an electrolyte layer 3 therebetween, the electrolyte layer 3 conducting only protons. At the anode 1, glucose supplied as a fuel is decomposed by an enzyme to extract electrons and also generate protons ($H^+$). At the cathode 2, water is generated using protons transported from the anode 1 through the electrolyte layer 3, electrons transferred from the anode 1 through an external circuit, and oxygen in the air or the like.

The anode 1 has a structure in which an enzyme that contributes to the decomposition of glucose, a coenzyme (e.g., $NAD^+$ or $NADP^+$) whose reduced form is produced with an oxidation reaction in the decomposition process of glucose, a coenzyme oxidase (e.g., diaphorase) that oxidizes the reduced form (e.g., NADH or NADPH) of the coenzyme, and an electron mediator that receives electrons generated with the oxidation of the coenzyme from the coenzyme oxidase and delivers the electrons to an electrode 11 are immobilized on the electrode 11 (refer to FIG. 2) composed of, for example, porous carbon using an immobilizing material composed of a polymer or the like.

For example, glucose dehydrogenase (GDH) can be used as an enzyme that contributes to the decomposition of glucose. In the presence of the oxidase, for example, β-D-glucose can be oxidized into D-glucono-δ-lactone.

Furthermore, D-glucono-δ-lactone can be decomposed into 2-keto-6-phospho-D-gluconate in the presence of two enzymes, namely gluconokinase and phosphogluconate dehydrogenase (PhGDH). In other words, D-glucono-δ-lactone is converted into D-gluconate through hydrolysis and D-gluconate is phosphorylated into 6-phospho-D-gluconate by hydrolyzing adenosine triphosphate (ATP) into adenosine diphosphate (ADP) and phosphoric acid in the presence of gluconokinase. Through the action of the oxidase PhGDH, 6-phospho-D-gluconate is oxidized into 2-keto-6-phospho-D-gluconate.

Furthermore, glucose can be decomposed into $CO_2$ using glucose metabolism without using the above-described decomposition process. The decomposition process using the glucose metabolism is broadly divided into the decomposition of glucose and the generation of pyruvic acid through a glycolytic pathway and a TCA cycle, which are well-known reaction systems.

The oxidation reaction in the decomposition process of monosaccharides proceeds with the reduction reaction of a coenzyme. In most cases, the coenzyme is determined in accordance with an enzyme that acts in the decomposition process. If GDH is used, $NAD^+$ is used as a coenzyme. That is, when β-D-glucose is oxidized into D-glucono-δ-lactone through the action of GDH, $NAD^+$ is reduced to NADH to generate $H^+$.

The generated NADH is immediately oxidized into $NAD^+$ in the presence of diaphorase (DI) to generate two electrons and $H^+$. Thus, two electrons and two $H^+$ are generated per glucose molecule through a single step of oxidation reaction. Four electrons and four $H^+$ are generated in total through two steps of oxidation reaction.

The electrons generated through the above-described process are delivered from diaphorase to the electrode 11 through an electron mediator and $H^+$ are transported to the cathode 2 through the electrolyte layer 3.

The electron mediator performs the transference of electrons to/from the electrode 11, and the output voltage of fuel cells depends on the oxidation-reduction potential of the electron mediator. That is, to achieve a higher output voltage, an electron mediator having a more negative potential may be selected for the anode 1 side. However, the reaction affinity of the electron mediator for the enzyme, the electron-exchange rate with the electrode 11, the structural stability to inhibiting factors (e.g., light and oxygen), and the like also have to be considered. From these standpoints, 2-amino-3- carboxy-1,4-naphthoquinone (ACNQ), vitamin K3, or the like is preferably used as the electron mediator that acts on the anode 1. Examples of other usable electron mediators include compounds having a quinone skeleton; metal complexes of osmium (Os), ruthenium (Ru), iron (Fe), cobalt (Co), or the like; viologen compounds such as benzyl viologen; compounds having a nicotinamide structure; compounds having a riboflavin structure; and compounds having a nucleotide-phosphoric acid structure.

The electrolyte layer 3 is a proton conductor that transports $H^+$ generated at the anode 1 to the cathode 2, and is constituted by a material that has no electron conductivity and that can transport $H^+$. The electrolyte layer 3 can be composed of a material that is adequately selected from the materials mentioned above, for example. In such a case, the electrolyte layer 3 contains a buffer solution containing a compound having an imidazole ring as a buffer substance. The compound having an imidazole ring can be adequately selected from the compounds mentioned above, for example, imidazole. The concentration of the compound having an imidazole ring, which serves as a buffer substance, is selected according to need, and the concentration is preferably 0.2 M or more and 3 M or less. In such a case, a high buffering capacity can be achieved and the capability intrinsic to the enzyme can be satisfactorily exhibited even when the biofuel cell is operated at a high output. Furthermore, too high or too low ionic strength (I.S.) adversely affects the enzyme activity. In consideration of also electrochemical responsiveness, an appropriate ionic strength, for example, about 0.3 is preferable. However, as for the pH and the ionic strength, optimum values are different depending on the enzymes used, and are not limited to the above-described values.

The above-described enzyme, coenzyme, and electron mediator are preferably immobilized on the electrode 11 using an immobilizing material to efficiently convert an enzyme reaction phenomenon occurring near the electrode into an electrical signal. Moreover, the enzyme reaction system at the anode 1 can be stabilized by also immobilizing, on the electrode 11, an enzyme and a coenzyme that decompose a fuel. Examples of the immobilizing material include a material composed of glutaraldehyde (GA) and poly-L-lysine (PLL) and a material composed of sodium polyacrylate (PAAcNa) and poly-L-lysine (PLL). These materials may be used alone or other polymers may be used. By using a immobilizing material composed of glutaraldehyde and poly-L-lysine, the enzyme immobilization ability possessed by glutaraldehyde and poly-L-lysine can be significantly improved, and thus excellent enzyme immobilization ability of an immobilizing material as a whole can be achieved. In this case, the composition ratio of glutaraldehyde to poly-L-lysine is generally any, though the optimum value is dependent on the enzyme immobilized and the substrate of the enzyme. Specifically, the ratio of a glutaraldehyde aqueous solution (0.125%) to a poly-L-lysine aqueous solution (1%) may be 1:1, 1:2, or 2:1.

As an example, FIG. 2 shows the case where the enzyme that contributes to the decomposition of glucose is glucose dehydrogenase (GDH); the coenzyme whose reduced form is produced with an oxidation reaction in the decomposition process of glucose is $NAD^+$; the coenzyme oxidase that oxidizes NADH, which is the reduced form of the coenzyme, is diaphorase (DI); and the electron mediator that receives electrons generated with the oxidation of the coenzyme from the coenzyme oxidase and delivers the electrons to the electrode 11 is ACNQ.

The cathode 2 is configured so that an oxygen reductase and an electron mediator that receives and transfers electrons from/to an electrode are immobilized on the electrode composed of a material having pores therein such as porous carbon. For example, a bilirubin oxidase (BOD), a laccase, an ascorbic acid oxidase, or the like can be used as the oxygen reductase. As the electron mediator, for example, hexacyanoferrate ions generated by ionization of potassium hexacyanoferrate can be used. The electron mediator is preferably immobilized at a sufficiently high concentration of, for example, $0.64 \times 10^{-6}$ mol/mm$^2$ or more on average.

At the cathode 2, oxygen in the air is reduced by $H^+$ transferred from the electrolyte layer 3 and electrons sent from the anode 1 in the presence of the oxygen reductase to produce water.

In the operation (usage) of the fuel cell having the above-described configuration, when glucose is supplied to the anode 1 side, the glucose is decomposed by a catabolic enzyme containing an oxidase. As a result of the involvement of the oxidase in this decomposition process of monosaccharides, electrons and $H^+$ can be generated on the anode 1 side and a current can be generated between the anode 1 and the cathode 2.

In this biofuel cell, at least part of the surface of an electrode that is used for the cathode 2 and has pores therein and preferably most of the surface is made water repellent. Herein, the surface of an electrode includes both the outer surface of the electrode and the inner surfaces of the pores inside the electrode. Specifically, the water repellency is achieved by, for example, forming a water-repellent material on at least part of the surface of the electrode. In order to form the water-repellent material on the inner surfaces of the pores inside the electrode, the water-repellent material needs to be fine particles (powder) that are sufficiently smaller than the pores in size and the water-repellent material needs to be formed so as not to occupy most of the spaces in the pores. Various water-repellent materials can be used as the water-repellent material, and the water-repellent material is selected according to need. Preferably, for example, carbon particles such as graphite powder are used. As described above, in order to form the water-repellent material on at least part of the surface of the electrode, for example, a water repellent agent prepared by dispersing the water-repellent material in an organic solvent is applied to the surface of the electrode; the electrode is impregnated with the water-repellent agent through the pores therein; and the organic solvent is removed. When such a water-repellent agent is used, it is important not to deactivate the enzyme immobilized on the cathode 2. The deactivation of the enzyme can be prevented by using the organic solvent mentioned above. Furthermore, in this water-repellent electrode, the hydrophilicity of immobilizing substances such as an enzyme and an electron mediator immobilized on the electrode is preferably high.

Figure 3:
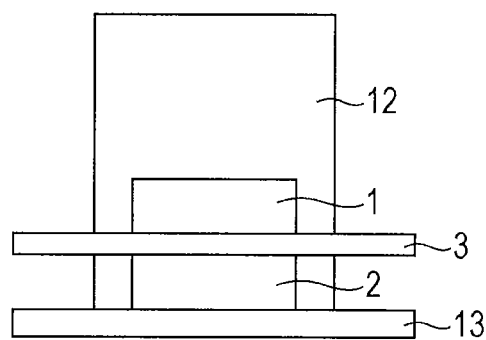
FIG. 3 is a schematic line diagram showing an example of the entire configuration of the biofuel cell according to the first embodiment.
Figure 4:
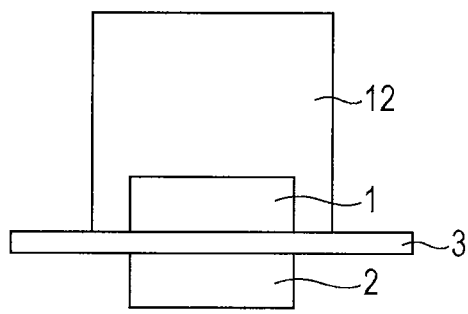
FIG. 4 is a schematic line diagram showing another example of the entire configuration of the biofuel cell according to the first embodiment.

FIGS. 3 and 4 show two examples of the entire structure of this biofuel cell.

The biofuel cell shown in FIG. 3 has a structure in which the anode 1 and the cathode 2 face each other with the electrolyte layer 3 therebetween; a sheet 13 composed of a material that passes air but does not pass a fuel solution 12 is attached to the surface of the cathode 2, the surface being opposite the electrolyte layer 3; and the fuel solution 12 (the container of the fuel solution 12 is not illustrated) is brought into contact with the entire outer surface (top and side surfaces) of the anode 1, the side surfaces of the anode 1 and the cathode 2, and a portion of the electrolyte layer 3 that protrudes from the cathode 2. For example, a nonwoven fabric is used as the electrolyte layer 3, but the electrolyte layer 3 is not limited thereto. Furthermore, for example, a PTFE (polytetrafluoroethylene) membrane is used as the sheet 13, but the sheet 13 is not limited thereto. This biofuel cell has an advantage in that the concentration of the fuel solution 12 can be maintained substantially constant because the side surface of the cathode 2 is in contact with the fuel solution 12 and thus water produced inside the cathode 2 is returned to the fuel solution 12 through the side surface of the cathode 2 with the progress of the cell reaction.

The biofuel cell shown in FIG. 4 has a structure in which the anode 1 and the cathode 2 face each other with the electrolyte layer 3 therebetween; and the fuel solution 12 (the container of the fuel solution 12 is not illustrated) is brought into contact with the entire outer surface (top and side surfaces) of the anode 1 and a portion of the electrolyte layer 3 that protrudes from the anode 1 and the cathode 2. For example, cellophane is used as the electrolyte layer 3, but the electrolyte layer 3 is not limited thereto.

Regarding the case where water repellency is imparted to the surface of an electrode and the case where water repellency is not imparted to the surface, the evaluation results of the cathode 2 are described.

An enzyme/electron mediator-immobilized electrode prepared as follows was used as the cathode 2. First, a commercially available carbon felt (BO050 manufactured by TORAY Industries Inc.) was prepared as porous carbon, and this carbon felt was cut into a one-centimeter square. Next, the carbon felt was sequentially impregnated with 80 µl of hexacyanoferrate ions (100 mM), 80 µl of poly-L-lysine (1 wt %), and 80 µl of a BOD solution (50 mg/ml), and then dried. Subsequently, the carbon felt was dipped in a water-repellent agent to coat the surface of the carbon felt with the water-repellent agent. The water-repellent agent contained 13 to 18% of natural graphite as a water-repellent material, 3 to 8% of polyvinyl butyral as a binder, 8.4% of carbon black, and 69.48% of methyl isobutyl ketone as an organic solvent. After that, the organic solvent contained in the water-repellent agent was removed by drying. Thus, graphite powder was formed on the surface of the carbon felt as a water-repellent material and water repellency was imparted to the surface. The thus-obtained enzyme/electron mediator-immobilized electrode had a thickness of 0.35 mm and an area of 1 square centimeter. Two or six of the enzyme/electron mediator-immobilized electrodes were placed on top of another to obtain the cathode 2. In addition, the same cathode 2 as that described above was prepared, except that water repellency was not imparted to the surface of the carbon felt.

In order to investigate the effect of the above-described water-repellent agent on the enzyme, that is, BOD immobilized on the cathode 2, when methyl isobutyl ketone, which is an organic solvent contained in the water-repellent agent, a BOD solution (5 mg/ml, 50 mM phosphate buffer solution), and an ABTS solution were mixed with each other, the phase separation between methyl isobutyl ketone and water was confirmed. In this case, it was confirmed that the BOD was still active. This is because BOD is not easily deactivated since BOD is present in an aqueous phase. Herein, the solubility of methyl isobutyl ketone in water is 1.91 g/100 mL.

Furthermore, heptane, hexane, toluene, isooctane, and diethyl ether were used as organic solvents. When each of the organic solvents, a BOD solution, and an ABTS solution were mixed with each other, the phase separation between the organic solvent and water was confirmed. In these cases, it was confirmed that the BOD was still active. Herein, heptane, toluene, and isooctane are insoluble in water, the solubility of hexane in water is 13 mg/L, and the solubility of diethyl ether in water is 6.9 g/100 mL.

Moreover, tetrahydrofuran (THF), acetone, ethanol, and N,N-dimethylformamide (DMF) were used as organic solvents. When each of the organic solvents, a BOD solution, and an ABTS solution were mixed with each other, it was confirmed that the mixed solution became cloudy. It is clear from the result that BOD is denatured. That is, BOD is deactivated when these organic solvents are used. Herein, tetrahydrofuran, acetone, ethanol, and N,N-dimethylformamide are all mixed with water.

Next, the water repellency of the carbon felt whose surface was made water repellent as described above was confirmed. Herein, the organic solvent contained in the water-repellent agent is methyl isobutyl ketone. Specifically, a carbon felt whose surface was made water repellent using a water-repellent agent and a carbon felt whose surface was not made water repellent were prepared. Subsequently, the amounts of moisture contained in these carbon felts when they were left at room temperature and when they were left at a temperature of 25° C. and a humidity of 100% for 6 hours were measured with Karl Fischer Moisture Meter (Model VA-100 manufactured by DIA INSTRUMENTS Co., Ltd.). The results are shown below.

Carbon Felt without Water Repellency
(1) Left at room temperature

| First | 632.5 |
| --- | --- |
| Second | 718.9 |
| Third | 645.1 |
| Average | 665.5 |

(2) Left at a temperature of 25° C. and a humidity of 100% for 6 hours

| First | 18482.2 |
| --- | --- |
| Second | 15434.4 |
| Third | 12549.1 |
| Average | 15488.6 |

Carbon Felt with Water Repellency
(1) Left at room temperature

| First | 1481.7 |
| --- | --- |
| Second | 756.6 |
| Third | 698.1 |
| Fourth | 1338.1 |
| Average | 1068.6 |

(2) Left at a temperature of 25° C. and a humidity of 100% for 6 hours

| First | 4943.8 |
| --- | --- |
| Second | 3516.8 |
| Third | 7280.8 |
| Average | 5247.1 |

It was found from the results above that the amount of moisture contained in the carbon felt whose surface was made water repellent using a water-repellent agent was about one third as small as that contained in the carbon felt whose surface was not made water repellent and therefore the carbon felt whose surface was made water repellent using a water-repellent agent certainly had water repellency.

Figure 5:
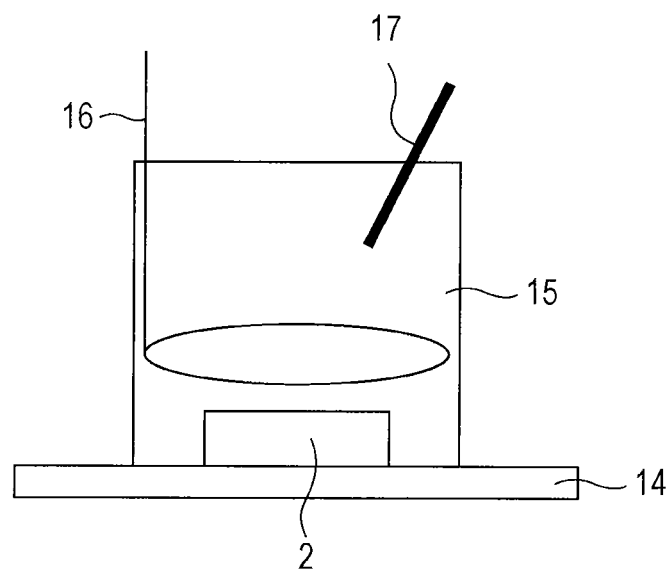
FIG. 5 is a schematic line diagram showing a measurement system used for the measurement of chronoamperometry performed in order to evaluate the biofuel cell according to the first embodiment.
Figure 6:
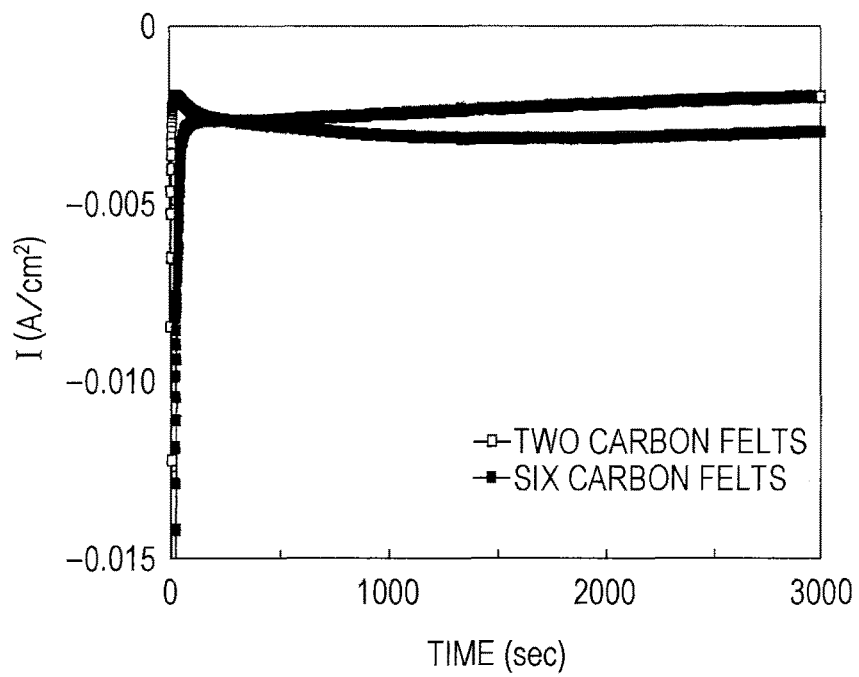
FIG. 6 is a schematic line diagram showing the result of chronoamperometry performed in order to evaluate the biofuel cell according to the first embodiment.
Figure 7:
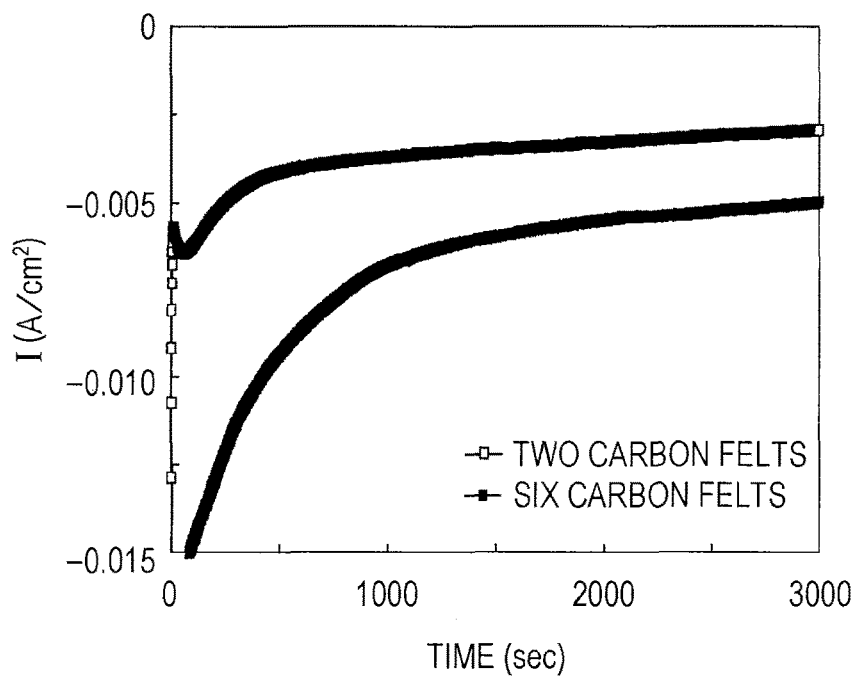
FIG. 7 is a schematic line diagram showing the result of chronoamperometry performed in order to evaluate the biofuel cell according to the first embodiment.

The measurement results of the electrochemical characteristics of the cathode 2 constituted by the enzyme/electron mediator-immobilized electrode prepared as described above will be described. FIG. 5 shows the measurement system used. As shown in FIG. 5, the cathode 2 set as a working electrode was placed on an air-permeable PTFE membrane 14 and pressed, and the measurement was performed while a buffer solution 15 was in contact with the cathode 2. A counter electrode 16 and a reference electrode 17 were immersed in the buffer solution 15, and an electrochemical measuring device (not shown) was connected to the cathode 2 serving as a working electrode, the counter electrode 16, and the reference electrode 17. A Pt wire was used as the counter electrode 16 and Ag|AgCl was used as the reference electrode 17. The measurement was performed at atmospheric pressure at 25° C. An imidazole/hydrochloric acid buffer solution (pH 7, 2.0 M) was used as the buffer solution 15. Chronoamperometry was performed for 3600 seconds using the measurement system shown in FIG. 5. FIG. 6 shows the results obtained in the case where the cathode 2 is an enzyme/electron mediator-immobilized electrode that uses the carbon felt whose surface is not made water repellent. FIG. 7 shows the results obtained in the case where the cathode 2 is an enzyme/electron mediator-immobilized electrode that uses the carbon felt having water repellency with a water-repellent agent. As is clear from FIGS. 6 and 7, the current value after 3600 seconds at the cathode 2 constituted by the enzyme/electron mediator-immobilized electrode that uses the carbon felt having water repellency with a water-repellent agent is about 50% higher than that at the cathode 2 constituted by the enzyme/electron mediator-immobilized electrode that uses the carbon felt whose surface is not made water repellent. Accordingly, the effectiveness of imparting water repellency to the surface of the electrode of the cathode 2 is proved.

Figure 8:
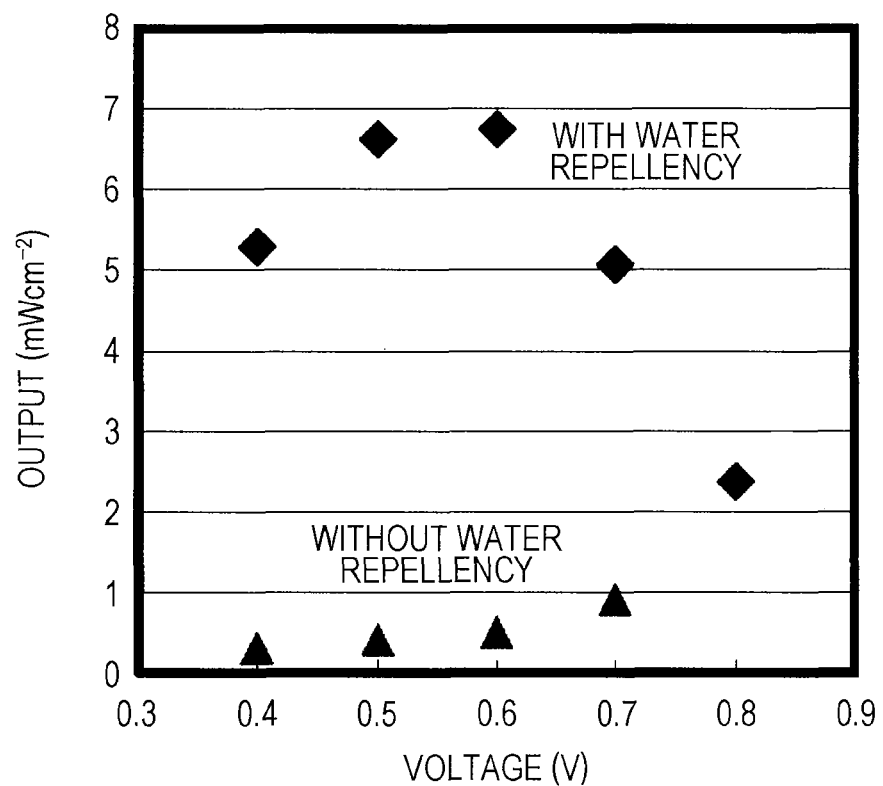
FIG. 8 is a schematic line diagram showing the measurement result of an output of the biofuel cell used for evaluation in the first embodiment.

The output of the biofuel cell having the configuration shown in FIG. 3 was measured. An enzyme/electron mediator-immobilized electrode that uses the carbon felt having water repellency with a water-repellent agent and an enzyme/electron mediator-immobilized electrode that uses the carbon felt whose surface is not made water repellent were used as the cathode 2. An enzyme/coenzyme/electron mediator-immobilized electrode prepared by immobilizing GDI serving as an enzyme, DI serving as a coenzyme, and ANQ serving as an electron mediator on a porous carbon electrode was used as the anode 1. A nonwoven fabric was used as the electrolyte layer 3. As a fuel solution, 0.4 M glucose solution was used. FIG. 8 shows the measurement results of the output. As is clear from FIG. 8, in the case where the enzyme/electron mediator-immobilized electrode that uses the carbon felt having water repellency with a water-repellent agent is used as the cathode 2, the output is about 10 times as high as that in the case where the enzyme/electron mediator-immobilized electrode that uses the carbon felt whose surface is not made water repellent is used as the cathode 2. This may be because the amount of moisture contained in the cathode 2 is maintained in an optimum range. It is found from the experiment performed separately that, when a change in a catalyst current value according to the amount of moisture contained in the cathode 2 is measured, the catalyst current value is dramatically changed when (volume of moisture contained in electrode)/(pore volume of electrode) reaches 70% and an excessively high catalyst current value is obtained at 70% or less. In consideration of this result, it is believed that the amount of moisture contained in the cathode 2 is maintained at 70% or less.

Figure 9:
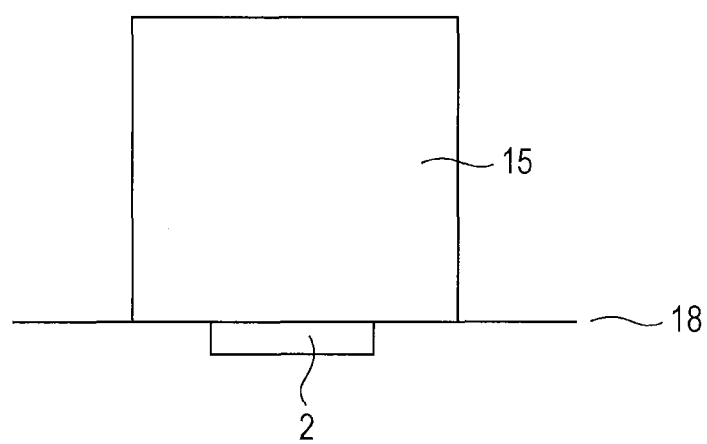
FIG. 9 is a schematic line diagram showing a measurement system used for the measurement of chronoamperometry performed in order to evaluate the biofuel cell according to the first embodiment.
Figure 10:
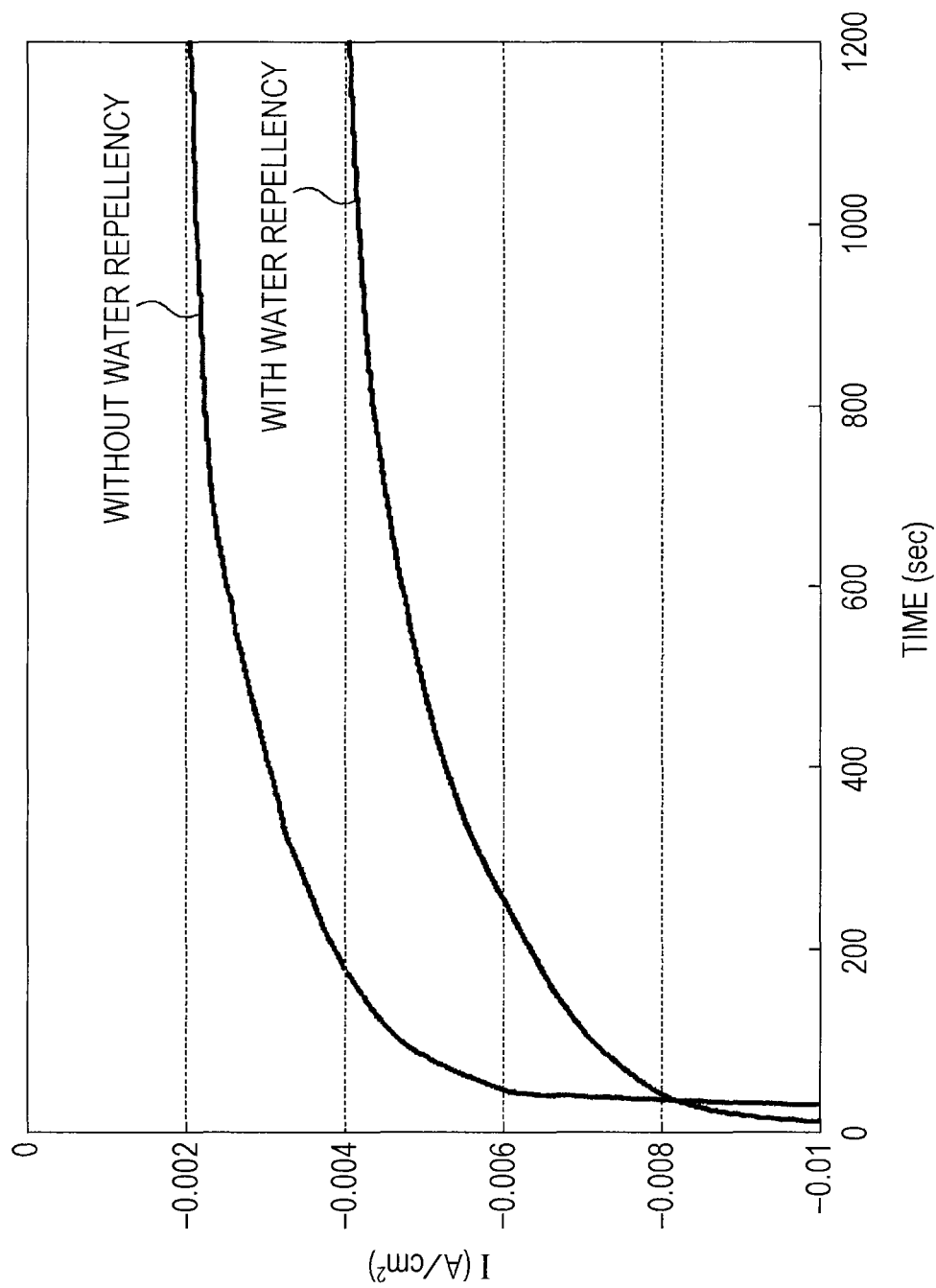
FIG. 10 is a schematic line diagram showing the result of chronoamperometry performed in order to evaluate the biofuel cell according to the first embodiment.

Next, the measurement results of the electrochemical characteristics of the cathode 2 constituted by the enzyme/electron mediator-immobilized electrode prepared as described above will be described, the electrochemical characteristics being measured using the measurement system shown in FIG. 9. As shown in FIG. 9, in this measurement system, the measurement was performed while a film-like cellophane 18 was placed on the cathode 2 and a buffer solution 15 was brought into contact with the cellophane 18. Chronoamperometry was performed for 3600 seconds using this measurement system. FIG. 10 shows the results obtained in the case where the cathode 2 is an enzyme/electron mediator-immobilized electrode that uses the carbon felt whose surface is not made water repellent and in the case where the cathode 2 is an enzyme/electron mediator-immobilized electrode that uses the carbon felt having water repellency with a water-repellent agent. As is clear from FIG. 10, the current value after 1200 seconds obtained in the case where the cathode 2 is constituted by the enzyme/electron mediator-immobilized electrode that uses the carbon felt having water repellency with a water-repellent agent is about twice as high as that in the case where the cathode 2 is constituted by the enzyme/electron mediator-immobilized electrode that uses the carbon felt whose surface is not made water repellent. Accordingly, the effectiveness of imparting water repellency to the surface of the electrode of the cathode 2 is also proved.

Figure 11:
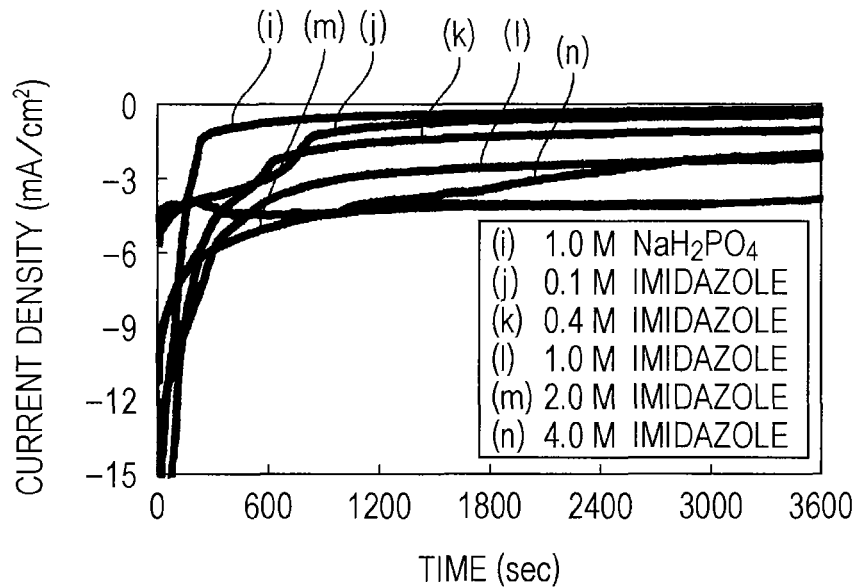
FIG. 11 is a schematic line diagram showing the result of chronoamperometry performed in order to describe the effect achieved by using a buffer solution containing imidazole in the biofuel cell according to the first embodiment.
Figure 12:
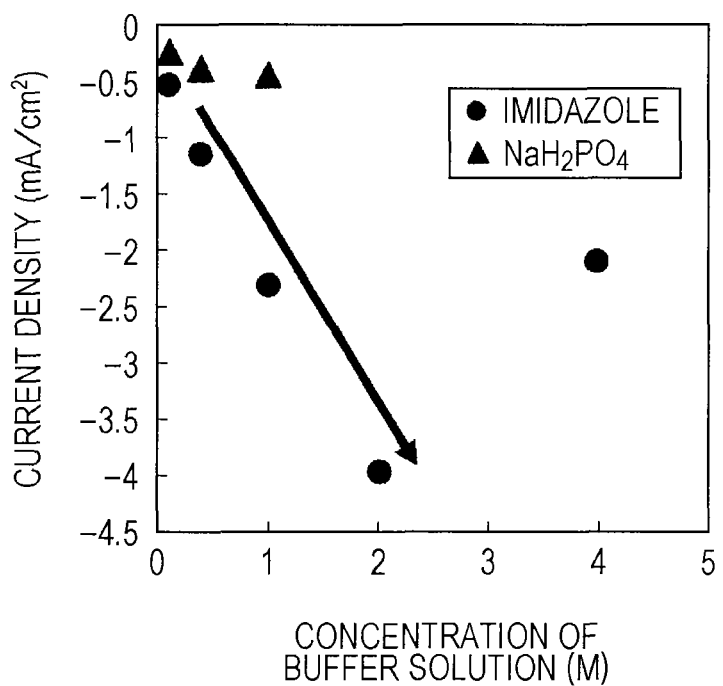
FIG. 12 is a schematic line diagram showing the relationship between the concentration of a buffer solution and the current density obtained, the relationship being obtained from the result of chronoamperometry performed in order to describe the effect achieved by using a buffer solution containing imidazole in the biofuel cell according to the first embodiment.
Figure 13:
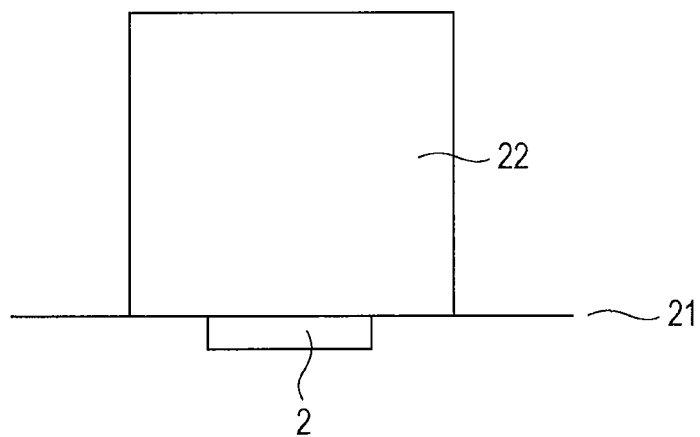
FIG. 13 is a schematic line diagram showing a measurement system used for the measurement of chronoamperometry performed in order to describe the effect achieved by using a buffer solution containing imidazole in the biofuel cell according to the first embodiment.

Next, the effect of improvement in maintaining a current value is described in the case where BOD is immobilized on the cathode 2 as an oxygen reductase and a solution prepared by mixing imidazole and hydrochloric acid so as to have pH 7 is used as a buffer solution. Table 1 and FIG. 11 show the results of chronoamperometry measured by changing the concentration of imidazole in this case. Furthermore, FIG. 12 shows the dependence of a current value (current density after 3600 seconds shown in Table 1 and FIG. 11) on the concentration of a buffer solution (the concentration of a buffer substance in a buffer solution). For comparison, Table 1 and FIG. 12 also show the result obtained in the case where 1.0 M $NaH_2PO_4$/NaOH buffer solution (pH 7) is used as the buffer solution. As shown in FIG. 13, the measurement was performed while a film-like cellophane 21 was placed on the cathode 2 and a buffer solution 22 was brought into contact with the cellophane 21. An enzyme/electron mediator-immobilized electrode prepared as follows was used as the cathode 2. First, a commercially available carbon felt (BO050 manufactured by TORAY Industries Inc.) was used as porous carbon, and this carbon felt was cut into a one-centimeter square. Next, the carbon felt was sequentially impregnated with 80 μl of hexacyanoferrate ions (100 mM), 80 μl of poly-L-lysine (1 wt %), and 80 μl of a BOD solution (50 mg/ml), and then dried to obtain an enzyme/electron mediator-immobilized electrode. Two of the thus-prepared enzyme/electron mediator-immobilized electrodes were arranged so as to overlap with each other to obtain the cathode 2.

TABLE 1

| | Current density (mA/cm$^2$) | | | | | |
|---|---|---|---|---|---|---|
| | 1 sec | 180 sec | 300 sec | 600 sec | 1800 sec | 3600 sec |
| 1.0M $NaH_2PO_4$ | −17.22 | −3.11 | −1.10 | −0.73 | −0.41 | −0.34 |

TABLE 1-continued

| | Current density (mA/cm$^2$) | | | | | |
|---|---|---|---|---|---|---|
| | 1 sec | 180 sec | 300 sec | 600 sec | 1800 sec | 3600 sec |
| 0.1M Imidazole | −5.64 | −3.98 | −3.71 | −2.98 | −0.70 | −0.54 |
| 0.4M Imidazole | −11.18 | −6.37 | −4.69 | −2.48 | −1.35 | −1.16 |
| 1.0M Imidazole | −15.59 | −8.44 | −5.81 | −3.86 | −2.60 | −2.32 |
| 2.0M Imidazole | −25.10 | −7.39 | −5.88 | −5.01 | −4.20 | −3.99 |
| 4.0M Imidazole | −5.08 | −3.90 | −4.19 | −4.53 | −3.47 | −2.13 |

As is clear from Table 1 and FIG. 11, when the concentration of NaH$_2$PO$_4$ is 1.0 M, the initial current is generated but the current is considerably decreased after 3600 seconds. In contrast, particularly when the concentration of imidazole is 0.4 M, 1.0 M, or 2.0 M, a decrease in current is hardly observed even after 3600 seconds. As is obvious from FIG. 12, at an imidazole concentration of 0.2 to 2.5 M, a current value is linearly increased with respect to the concentration. Moreover, despite the fact that the NaH$_2$PO$_4$/NaOH buffer solution and the imidazole/hydrochloric acid buffer solution both have a pK$_a$ value of about 7 and substantially the same oxygen solubility, in the case where the concentrations of the buffer solutions are the same as each other, a larger oxygen-reduction current is obtained in the buffer solution containing imidazole.

Figure 14:
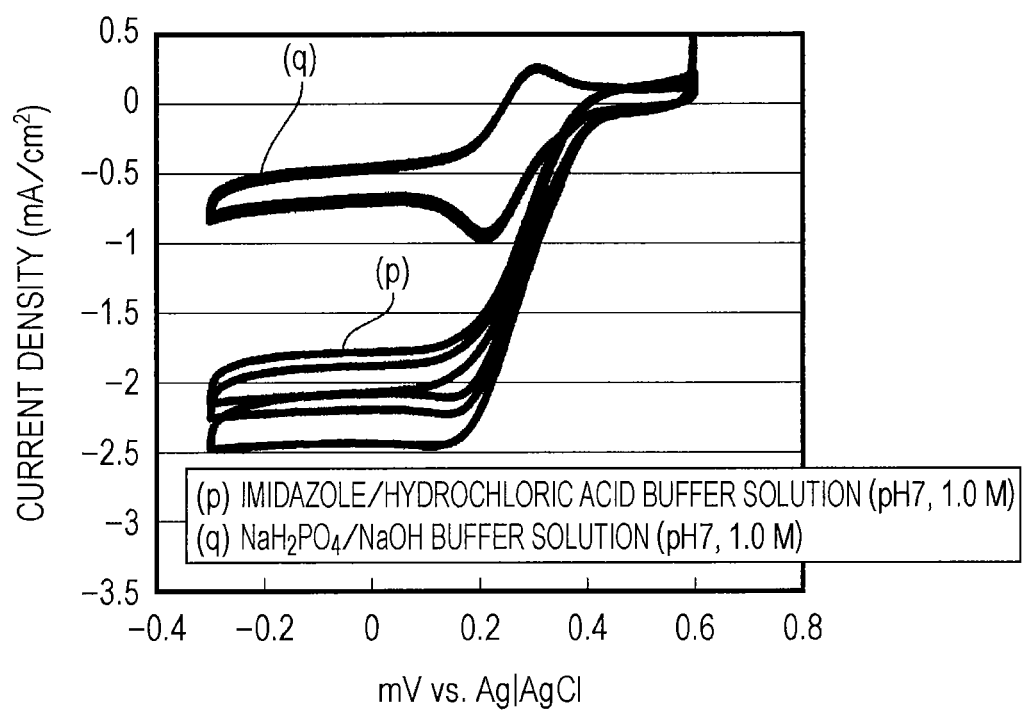
FIG. 14 is a schematic line diagram showing the result of cyclic voltammetry performed in order to describe the effect achieved by using a buffer solution containing imidazole in the biofuel cell according to the first embodiment.
Figure 15:
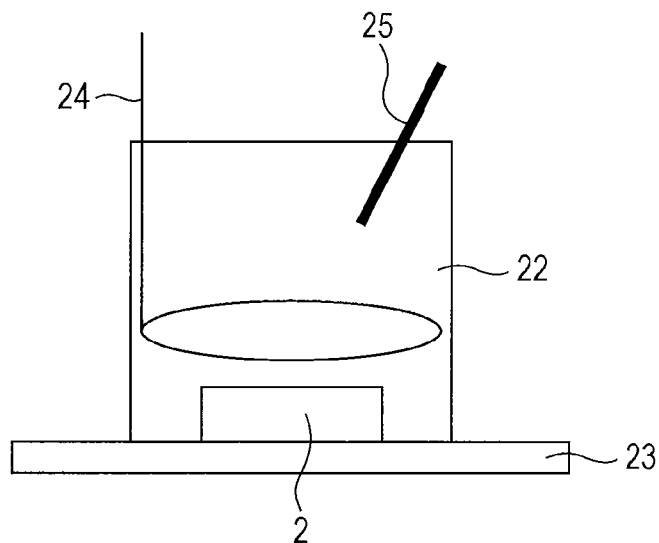
FIG. 15 is a schematic line diagram showing a measurement system used for the measurement of cyclic voltammetry shown in FIG. 14.

After chronoamperometry was performed for 3600 seconds as described above, cyclic voltammetry (CV) was performed in a potential range of −0.3 to +0.6 V. FIG. 14 shows the results. Note that this measurement was performed in a state in which, as shown in FIG. 15, the cathode 2 constituted by the same enzyme/electron mediator-immobilized electrode as that described above except that water repellency was not imparted was used as a working electrode; this working electrode was placed on an air-permeable PTFE membrane 23; and a buffer solution 22 was brought into contact with the cathode 2. A counter electrode 24 and a reference electrode 25 were immersed in the buffer solution 22, and an electrochemical measuring device (not shown) was connected to the cathode 2 serving as a working electrode, the counter electrode 24, and the reference electrode 25. A Pt wire was used as the counter electrode 24 and Ag|AgCl was used as the reference electrode 25. The measurement was performed at atmospheric pressure at 25° C. Two types of buffer solutions, i.e., an imidazole/hydrochloric acid buffer solution (pH 7, 1.0 M) and a NaH$_2$PO$_4$/NaOH buffer solution (pH 7, 1.0 M) were used as the buffer solution 22.

As is clear from FIG. 14, when the imidazole/hydrochloric acid buffer solution (pH 7, 1.0 M) is used as the buffer solution 22, extremely satisfactory CV characteristics are achieved.

From the above results, it is confirmed that an advantage lies in the imidazole buffer solution even if the measurement system is changed.

Figure 16:
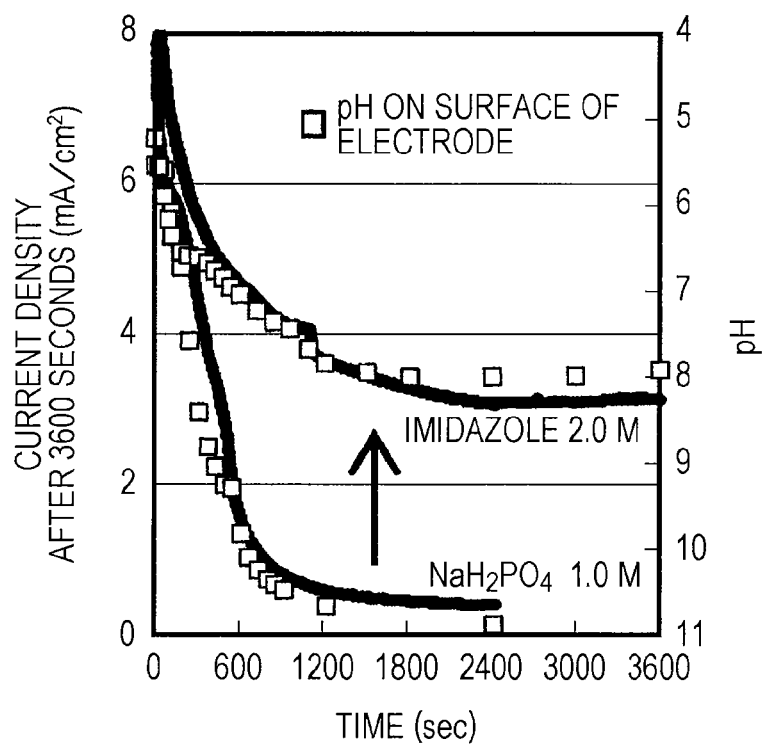
FIG. 16 is a schematic line diagram showing the result of chronoamperometry performed in order to describe the effect achieved by using a buffer solution containing imidazole in the biofuel cell according to the first embodiment.

FIG. 16 shows the results of chronoamperometry performed by the same method as that described above while BOD was immobilized on the cathode 2 and a 2.0 M imidazole/hydrochloric acid buffer solution and a 1.0 M NaH$_2$PO$_4$/NaOH buffer solution were used. FIG. 16 also shows the measurement results of pH on the electrode surface obtained during the chronoamperometry. Herein, the pK$_a$ of the imidazole/hydrochloric acid buffer solution is 6.95, the electrical conductivity is 52.4 mS/cm, the oxygen solubility is 0.25 mM, and the pH is 7. In addition, the pK$_a$ of the NaH$_2$PO$_4$/NaOH buffer solution is 6.82 (H$_2$PO$_4^-$), the electrical conductivity is 51.2 mS/cm, the oxygen solubility is 0.25 mM, and the pH is 7. As is clear from FIG. 16, in the case where the 2.0 M imidazole/hydrochloric acid buffer solution is used, the current density is about 15 times as high as that in the case where the 1.0 M NaH$_2$PO$_4$/NaOH buffer solution is used. Furthermore, as is obvious from FIG. 16, the change in current substantially corresponds to the change in pH on the electrode surface. The reasons why these results are obtained will be described with reference to FIGS. 17 and 18.

Figure 17:
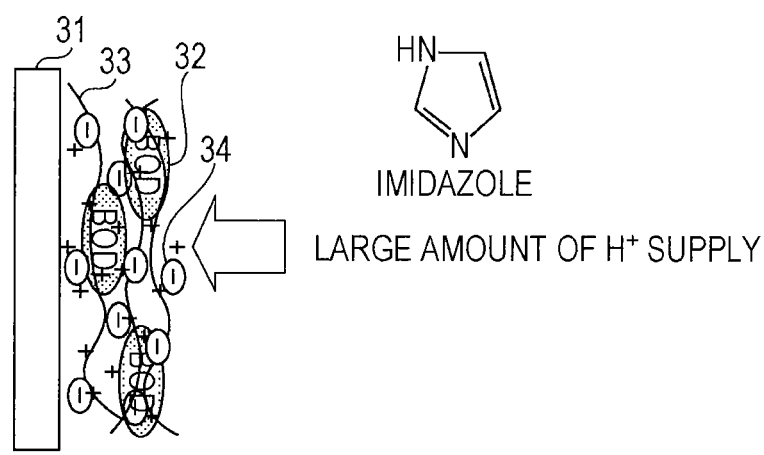
FIG. 17 is a schematic line diagram for describing a mechanism with which a large current can be steadily obtained when a buffer solution containing imidazole is used in the biofuel cell according to the first embodiment.
Figure 18:
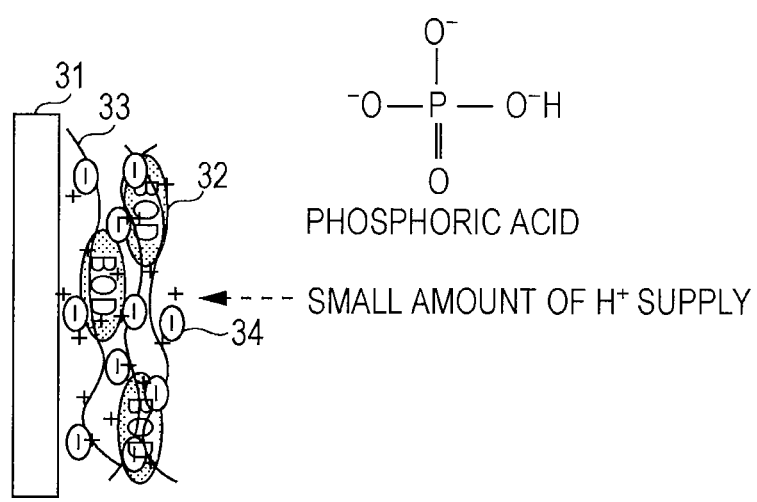
FIG. 18 is a schematic line diagram for describing a mechanism with which a current value is decreased when a $NaH_2PO_4$ buffer solution is used in the biofuel cell according to the first embodiment.

FIGS. 17 and 18 each show a state in which BOD 32 is immobilized on an electrode 31 together with an electron mediator 34 using an immobilizing material 33 such as a polyion complex. As shown in FIG. 17, it is believed that when a 2.0 M imidazole/hydrochloric acid buffer solution is used, a sufficiently large amount of protons (H$^+$) is supplied, whereby high buffering capacity is achieved and the pH is stabilized, which steadily achieves high current density. In contrast, as shown in FIG. 18, it is believed that when a 1.0 M NaH$_2$PO$_4$/NaOH buffer solution is used, the amount of H$^+$ supplied is small, whereby the buffering capacity becomes insufficient and the pH is significantly increased, which decreases the current density.

Figure 19:
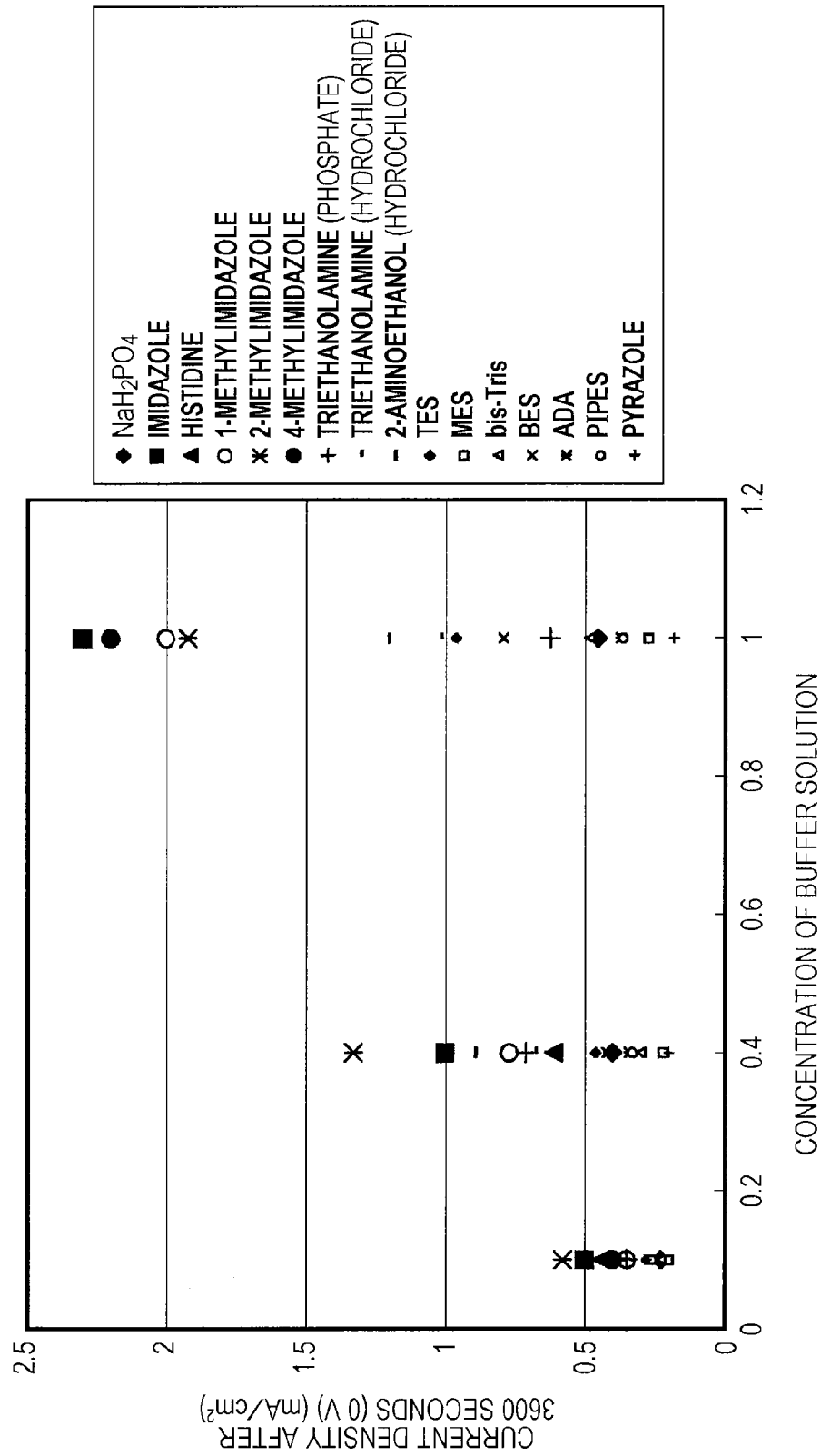
FIG. 19 is a schematic line diagram showing the relationship between the concentration of a buffer solution and the current density when various buffer solutions are used in the biofuel cell according to the first embodiment.
Figure 20:
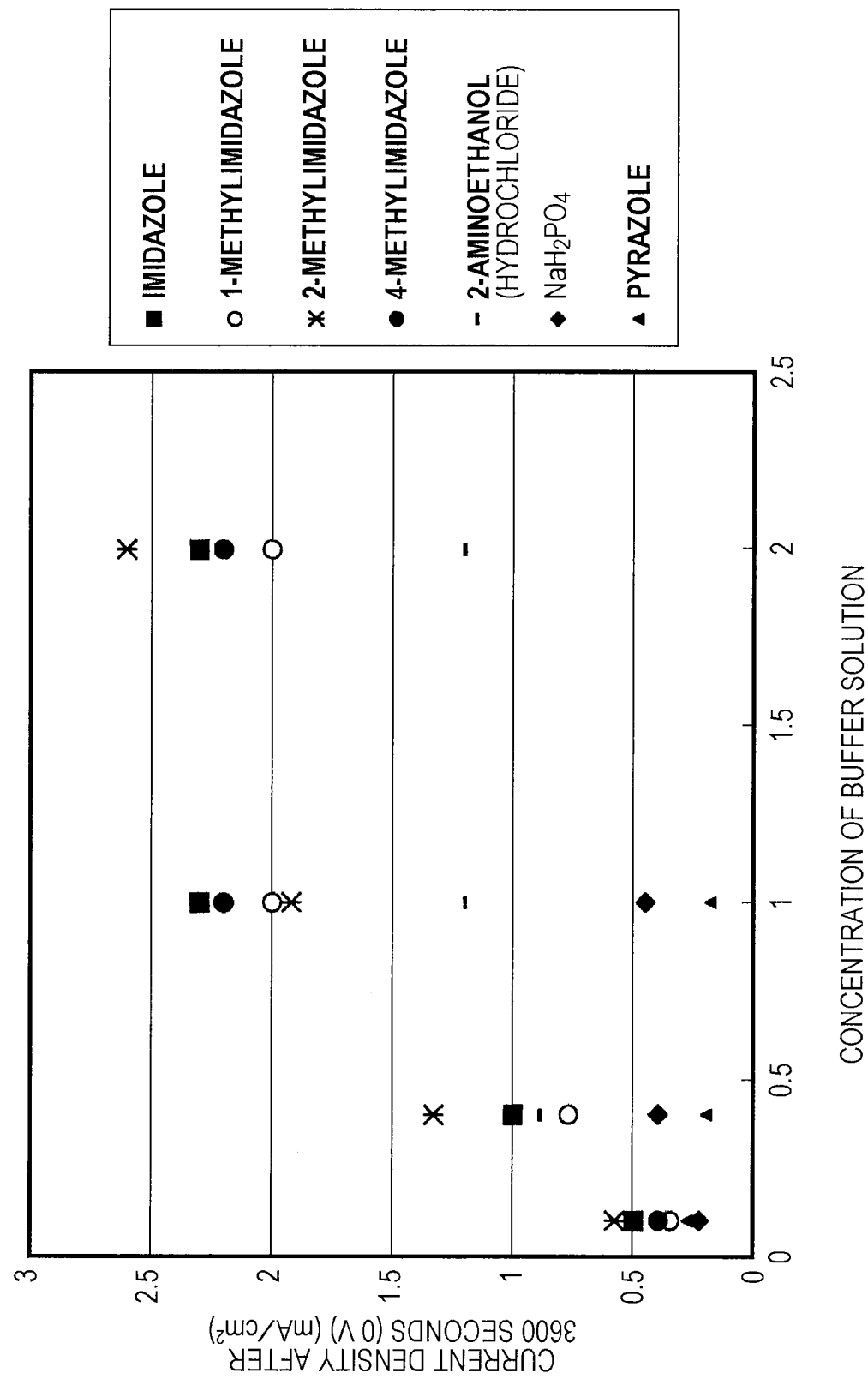
FIG. 20 is a schematic line diagram showing the relationship between the concentration of a buffer solution and the current density when various buffer solutions are used in the biofuel cell according to the first embodiment.

FIGS. 19 and 20 each show a change in current density after 3600 seconds (one hour) as a function of the concentration of a buffer solution when various buffer solutions were used. As is clear from FIGS. 19 and 20, in the cases where buffer solutions each containing a compound having an imidazole ring are used, high current densities are generally achieved compared with the cases where other buffer solutions such as a buffer solution containing NaH$_2$PO$_4$ are used. In particular, this tendency becomes significant as the concentration of the buffer solution is increased. Furthermore, as is clear from FIGS. 19 and 20, in the case where a buffer solution containing 2-aminoethanol, triethanolamine, TES, or BES as a buffer substance is used, high current density is also achieved. In particular, this tendency becomes significant as the concentration of the buffer solution is increased.

Figure 21:
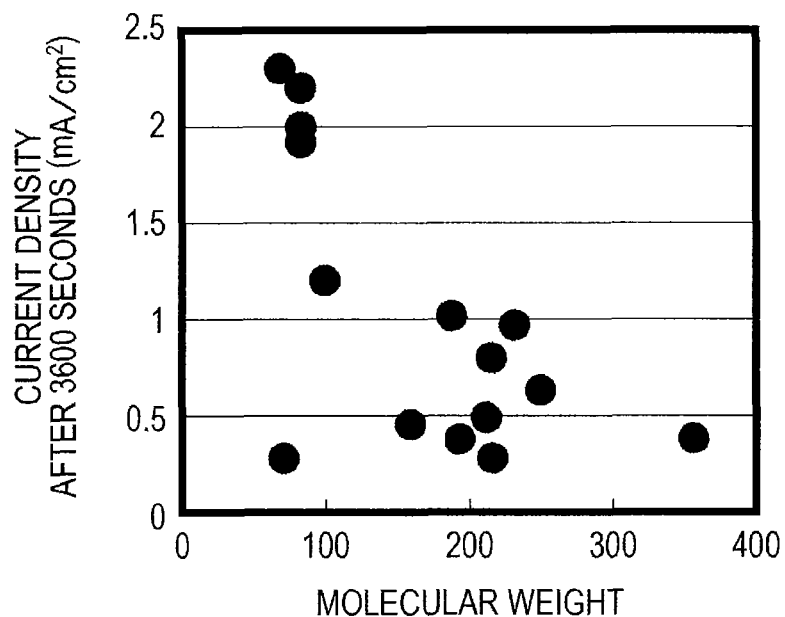
FIG. 21 is a schematic line diagram showing the relationship between the molecular weight of a buffer substance of a buffer solution and the current density when various buffer solutions are used in the biofuel cell according to the first embodiment.
Figure 22:
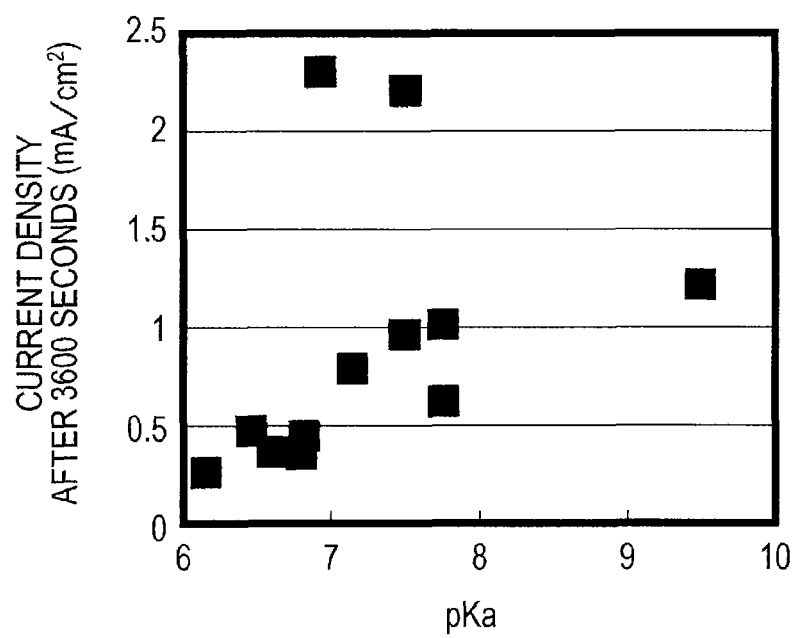
FIG. 22 is a schematic line diagram showing the relationship between the $pK_a$ of a buffer solution and the current density when various buffer solutions are used in the biofuel cell according to the first embodiment.

FIGS. 21 and 22 are plots of the current densities after 3600 seconds as a function of the molecular weight of a buffer substance and the pK$_a$, respectively, when the buffer solutions shown in FIGS. 19 and 20 are used.

As described above, according to the first embodiment, since the electrode surface of the cathode 2 has water repellency while maintaining the activity of an enzyme, the amount of moisture contained in the cathode 2 can be maintained in an optimum range and thus high catalyst current can be achieved, whereby a high current value can be continuously achieved in biofuel cells. In addition, the electrolyte layer 3 contains a compound having an imidazole ring as a buffer substance, whereby sufficient buffer capacity can be achieved. Therefore, even if an increase and decrease in the number of protons is caused in an electrode or an enzyme-immobilized film due to the enzyme reaction using protons during the high-output operation of the biofuel cell, sufficient buffering capacity can be achieved and a shift, of pH of an electrolyte around an enzyme, from optimum pH can be sufficiently reduced. Thus, the capacity intrinsic to the enzyme can be satisfactorily exerted, and an electrode reaction caused with an enzyme, a coenzyme, an electron mediator, and the like can be efficiently and steadily performed. This can provide a high-performance biofuel cell that can perform a high-output operation. Such a biofuel cell is suitably applied to the power sources of various electronic apparatuses, mobile units, and power generation systems.

Next, a biofuel cell according to a second embodiment will be described.

In this biofuel cell, an electrolyte layer 3 has a charge of the same sign as that of an oxidized form or a reduced form of an electron mediator used in a cathode 2 and an anode 1. For example, the surface of at least the cathode 2 side of the electrolyte layer 3 is negatively charged and has a negative charge. Specifically, for example, a polyanion having a negative charge is contained in the entire portion or part of a portion of at least the cathode 2 side of the electrolyte layer 3. Preferably, Nafion (trade name, DuPont, USA), which is an ion exchange resin having a fluorine-containing carbon sulfonic acid group, is used as the polyanion.

Herein, a description will be made of the results of comparative experiments conducted in order to verify that, when the electrolyte layer 3 has a charge of the same sign as that of an oxidized form or a reduced form of the electron mediator, passing of the oxidized form or the reduced form of the electron mediator through the electrolyte layer 3 can be prevented.

Figure 23:
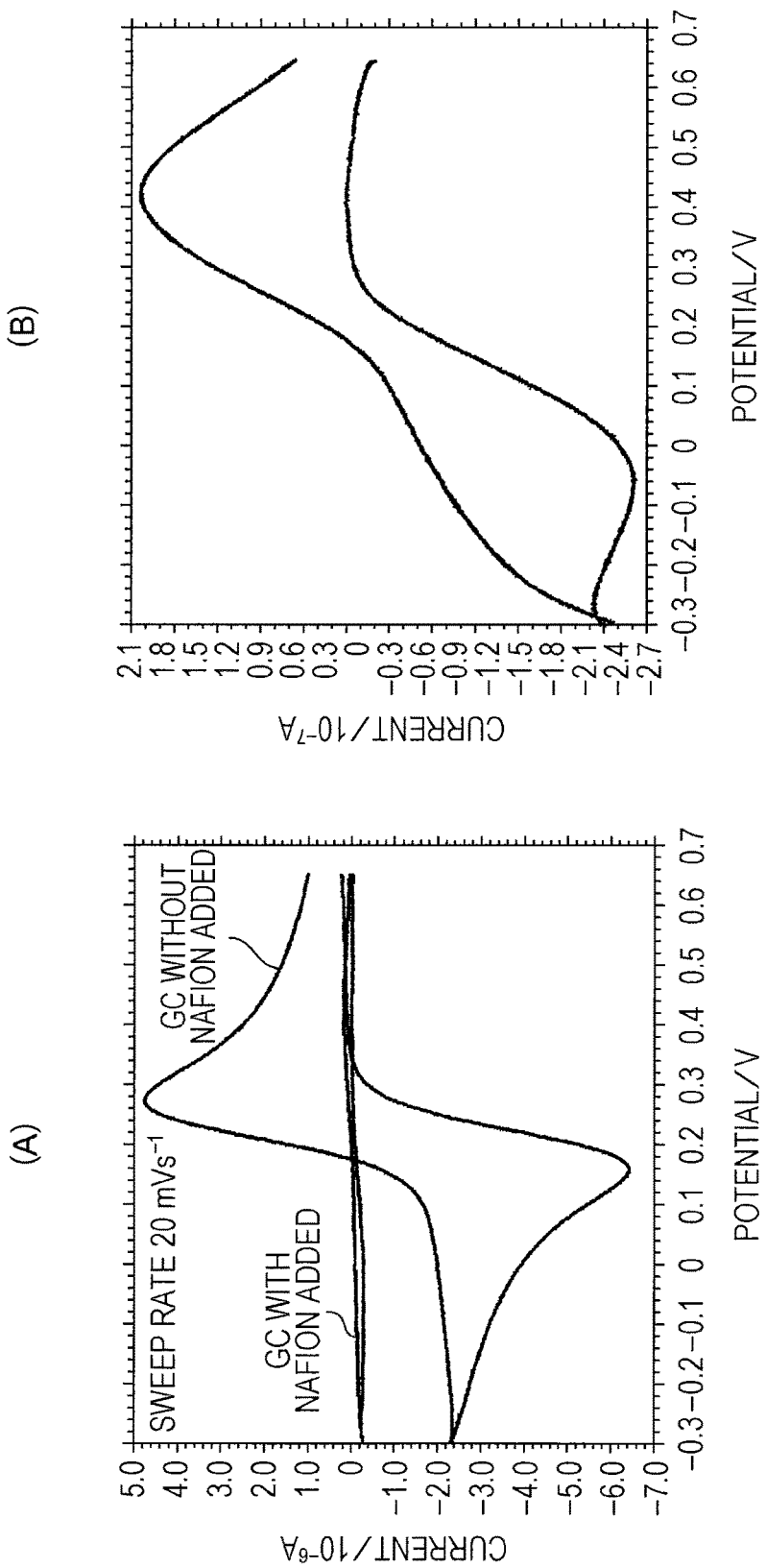
FIG. 23 is a schematic line diagram showing the result of cyclic voltammetry performed in order to verify the effect of preventing the passing of an electron mediator in a biofuel cell according to a second embodiment.

First, two commercially available glassy carbon (GC) electrodes (diameter: 3 mm) were prepared, and both electrodes were polished and washed. Next, 5 µl of an emulsion (20%) of commercially available Nafion, which is a polyanion, was added to one of the glassy carbon electrodes, and the electrode was dried. Subsequently, the two glassy carbon electrodes were immersed in a 1 mM hexacyanoferrate ion (polyvalent anion) aqueous solution (50 mM $NaH_2PO_4$/NaOH buffer solution, pH 7), and cyclic voltammetry (CV) was performed at a sweep rate of 20 $mV_s^{-1}$. FIG. 23(A) shows the results. FIG. 23(B) shows enlarged CV curves in FIG. 23(A) obtained in the case where the Nafion-added glassy carbon electrode was used. As is understood from FIGS. 23(A) and 23(B), in the Nafion-added glassy carbon electrode, an oxidation-reduction peak current resulting from the hexacyanoferrate ions serving as an electron mediator became ½₀ or less compared with the glassy carbon electrode to which Nafion was not added. This result shows that, compared with the Nafion, which is a polyanion having a negative charge, the hexacyanoferrate ions, which are polyvalent anions having a negative charge as in this Nafion, do not diffuse or pass.

Figure 24:
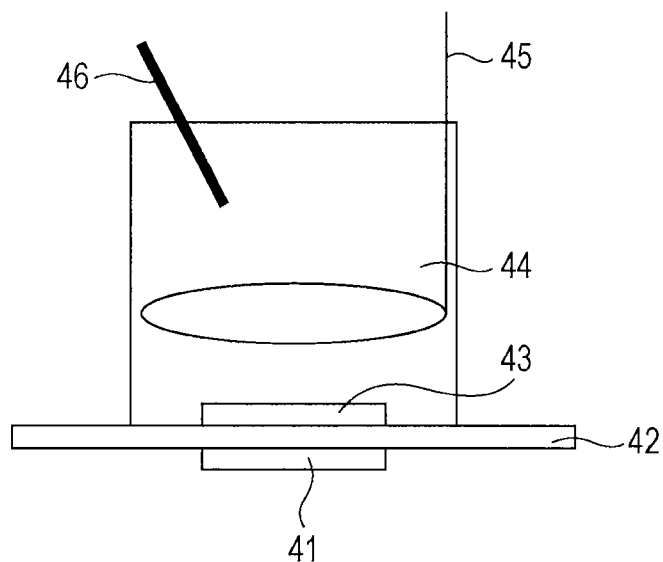
FIG. 24 is a schematic line diagram showing a measurement system of cyclic voltammetry performed in order to verify the effect of preventing the passing of an electron mediator in the biofuel cell according to the second embodiment.
Figure 25:
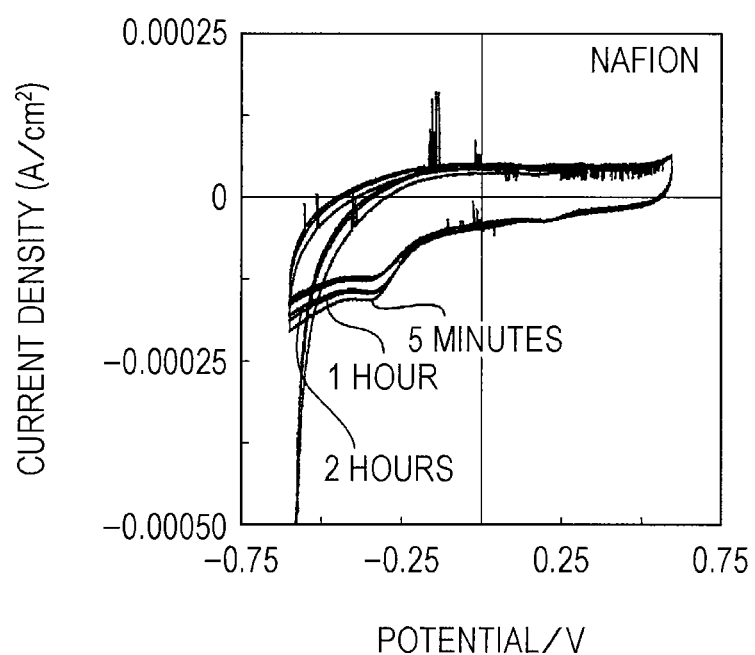
FIG. 25 is a schematic line diagram showing the result of cyclic voltammetry performed in order to verify the effect of preventing the passing of an electron mediator in the biofuel cell according to the second embodiment.
Figure 26:
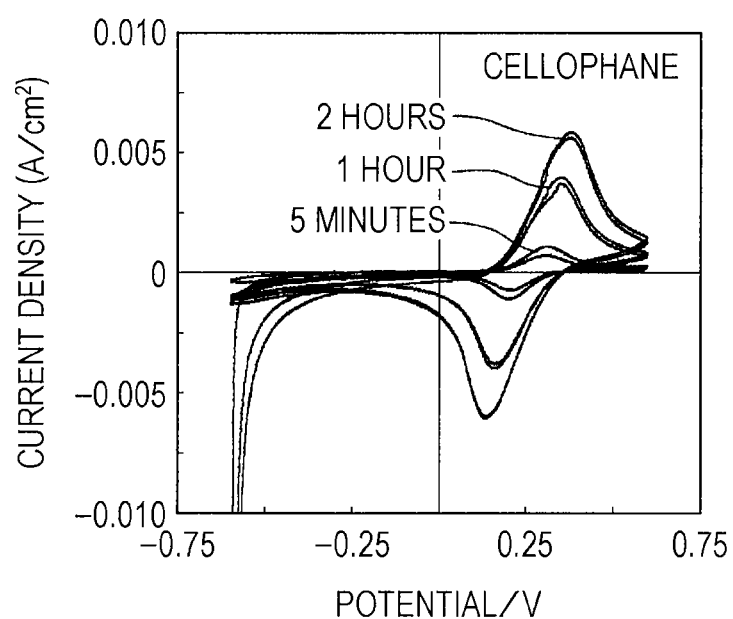
FIG. 26 is a schematic line diagram showing the result of cyclic voltammetry performed in order to verify the effect of preventing the passing of an electron mediator in the biofuel cell according to the second embodiment.

Next, a commercially available carbon felt (BO050 manufactured by TORAY Industries Inc.) was used as porous carbon. This carbon felt was cut into a one-centimeter square. The carbon felt was impregnated with 80 µl of hexacyanoferrate ions (1 M) and then dried. Two of the thus-prepared electrodes were arranged so as to overlap with each other to obtain a test electrode. As shown in FIG. 24, a film-like separator 42 (corresponding to the electrolyte layer 3) was placed on the test electrode 41, and a working electrode 43 was disposed so as to face the test electrode 41 with the separator 42 therebetween. A commercially available carbon felt (BO050 manufactured by TORAY Industries Inc.) cut into a one-centimeter square was used as this working electrode 43. Furthermore, a solution prepared by dissolving hexacyanoferrate ions as an electron mediator in a buffer solution 44 composed of 0.4 M $NaH_2PO_4$/NaOH (pH 7) (the container of the buffer solution 44 is not illustrated) was brought into contact with the separator 42 and the working electrode 43. Cellophane, which has no charge, and Nafion (pH 7), which is a polyanion having a negative charge, were used as the separator 42. Cyclic voltammetry was performed five minutes, one hour, and two hours after the buffer solution 44 (electrolytic solution) having hexacyanoferrate ions dissolved therein was brought into contact with the separator 42, whereby the values of oxidation-reduction peaks of the electron mediators, i.e., hexacyanoferrate ions, that had passed from the test electrode 41 through the separator 42 were compared with each other. A counter electrode 45 and a reference electrode 46 were immersed in the buffer solution 44, and an electrochemical measuring device (not shown) was connected to the working electrode 43, the counter electrode 45, and the reference electrode 46. A Pt wire was used as the counter electrode 45 and Ag|AgCl was used as the reference electrode 46. The measurement was performed at atmospheric pressure at 25° C. FIG. 25 shows the measurement results in the case where Nafion was used as the separator 42. FIG. 26 shows the measurement results in the case where cellophane was used as the separator 42. As is understood from FIG. 26, in the case where cellophane was used as the separator 42, as early as five minutes after the start of the measurement, an oxidation-reduction peak corresponding to hexacyanoferrate ions was observed, and the value of oxidation-reduction peak increased as the time elapsed. In contrast, as is understood from FIG. 25, in the case where Nafion was used as the separator 42, even if two hours had passed after the start of the measurement, no oxidation-reduction peak corresponding to hexacyanoferrate ions was observed. Accordingly, it was confirmed that when cellophane was used as the separator 42, hexacyanoferrate ions passed through the separator 42, but when Nafion was used as the separator 42, hexacyanoferrate ions did not pass through the separator 42.

According to the second embodiment, in addition to the same advantages as those of the first embodiment, the following advantage can be achieved. That is, since the electrolyte layer 3 has a charge of the same sign as that of an oxidized form or a reduced form of an electron mediator used in the cathode 2 and the anode 1, the passing of an electron mediator of one of the cathode 2 and the anode 1 through the electrolyte layer 3 and the moving of the electron mediator to the other one of the cathode 2 and the anode 1 can be effectively suppressed. Consequently, a decrease in the output and a decrease in the capacitance of the biofuel cell can be sufficiently suppressed.

Next, a biofuel cell according to a third embodiment will be described.

Figure 28:
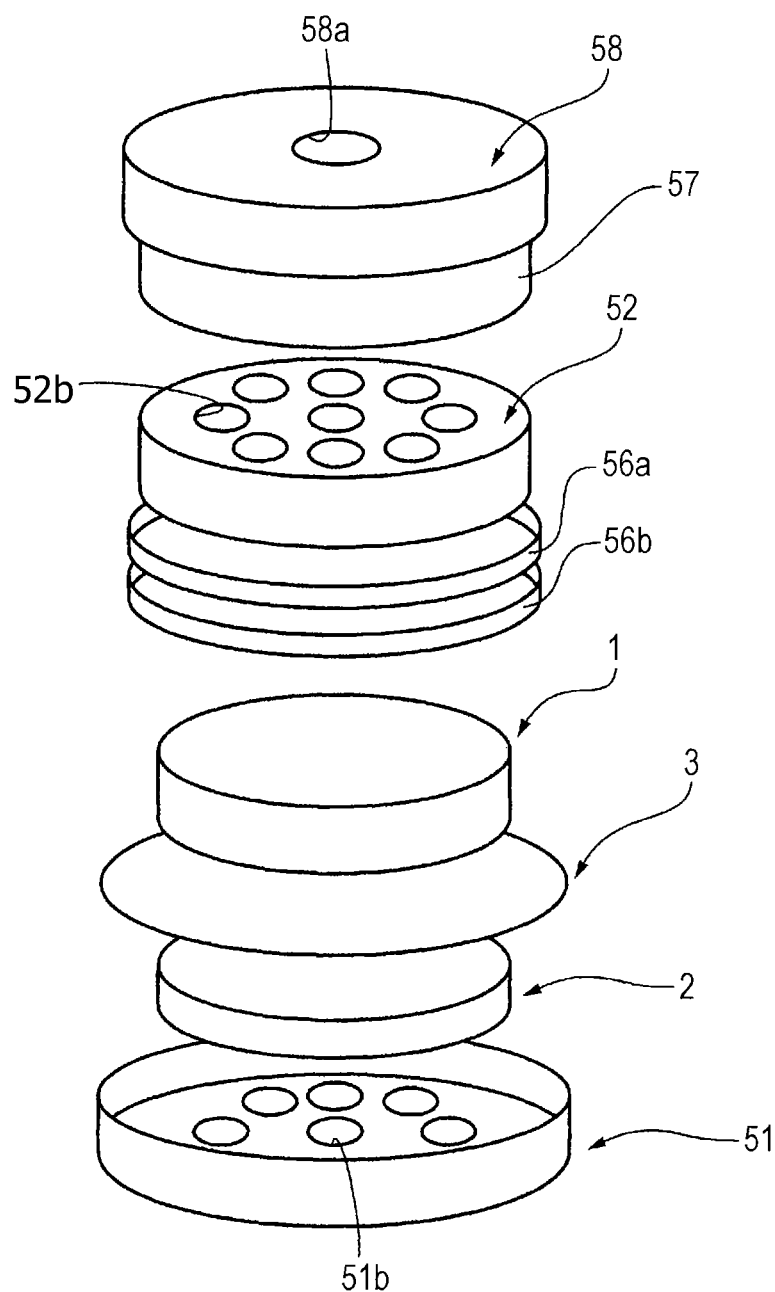
FIG. 28 is an exploded perspective view showing the biofuel cell according to the third embodiment.

FIGS. 27 and 28 show this biofuel cell. FIGS. 27(A), 27(B), and 27(C) are a top view, a sectional view, and a bottom view of the biofuel cell, respectively. FIG. 28 is an exploded perspective view showing exploded individual components of the biofuel cell.

As shown in FIGS. 27 and 28, in this biofuel cell, a cathode 2, an electrolyte layer 3, and an anode 1 are accommodated inside a space formed between a cathode current collector 51 and an anode current collector 52 so as to be sandwiched between the cathode current collector 51 and the anode current collector 52 in a vertical direction. Among the cathode current collector 51, the anode current collector 52, the cathode 2, the electrolyte layer 3, and the anode 1, adjacent components are in close contact with each other. In this case, the cathode current collector 51, the anode current collector 52, the cathode 2, the electrolyte layer 3, and the anode 1 each have a circular planar shape, and the biofuel cell also has a circular planer shape as a whole.

The cathode current collector 51 is configured to collect a current generated at the cathode 2, and the current is transferred from the cathode current collector 51 to the outside. In addition, the anode current collector 52 is configured to collect a current generated at the anode 1. The cathode current collector 51 and the anode current collector 52 are generally composed of a metal or an alloy, but the material is not limited thereto. The cathode current collector 51 is flat and has a substantially cylindrical shape. The anode current collector 52 is also flat and has a substantially cylindrical shape. Furthermore, the edge of an outer peripheral portion 51a of the cathode current collector 51 is caulked to an outer peripheral portion 52a of the anode current collector 52 with a ring-shaped gasket 56a and a ring-shaped hydrophobic resin 56b therebetween, thereby forming a space in which the cathode 2, the electrolyte layer 3, and the anode 1 are accommodated. The gasket 56a is composed of an insulating material such as silicone rubber and the hydrophobic resin 56b is composed of, for example, polytetrafluoroethylene (PTFE). The hydrophobic resin 56b is disposed in the space surrounded by the cathode 2, the cathode current collector 51, and the gasket 56a so as to be in close contact with the cathode 2, the cathode current collector 51, and the gasket 56a. The hydrophobic resin 56b can effectively suppress excessive impregnation of a fuel to the cathode 2 side. The end of the electrolyte layer 3 extends outward from the cathode 2 and the anode 1 so as to be sandwiched between the gasket 56a and the hydrophobic resin 56b. The cathode current collector 51 has a plurality of oxidizing agent supply ports 51b formed in the entire surface of the bottom face thereof, and the cathode 2 is exposed in the oxidizing agent supply ports 51b. FIGS. 27(C) and 28 show thirteen circular oxidizing agent supply ports 51b, but this is a mere example, and the number, shape, size, and arrangement of the oxidizing agent supply ports 51b can be suitably selected. The anode current collector 52 also has a plurality of fuel supply ports 52b formed in the entire surface of the top face thereof, and the anode 1 is exposed in the fuel supply ports 52b. FIG. 28 shows seven circular fuel supply ports 52b, but this is a mere example, and the number, shape, size, and arrangement of the fuel supply ports 52b can be suitably selected.

The anode current collector 52 has a cylindrical fuel tank 57 disposed on the surface thereof, the surface being opposite the anode 1. The fuel tank 57 is formed integrally with the anode current collector 52. A fuel to be used (not shown), for example, a glucose solution, a glucose solution further containing an electrolyte, or the like is charged into the fuel tank 57. A cylindrical cover 58 is detachably attached to the fuel tank 57. The cover 58 is, for example, fitted into or screwed on the fuel tank 57. A circular fuel supply port 58a is formed in the center of the cover 58. The fuel supply port 58a is sealed by, for example, attaching a hermetic seal that is not shown in the drawing.

The configuration of this biofuel cell other than the above-described configuration is the same as that of the first embodiment as long as the nature thereof is not impaired.

Figure 29:
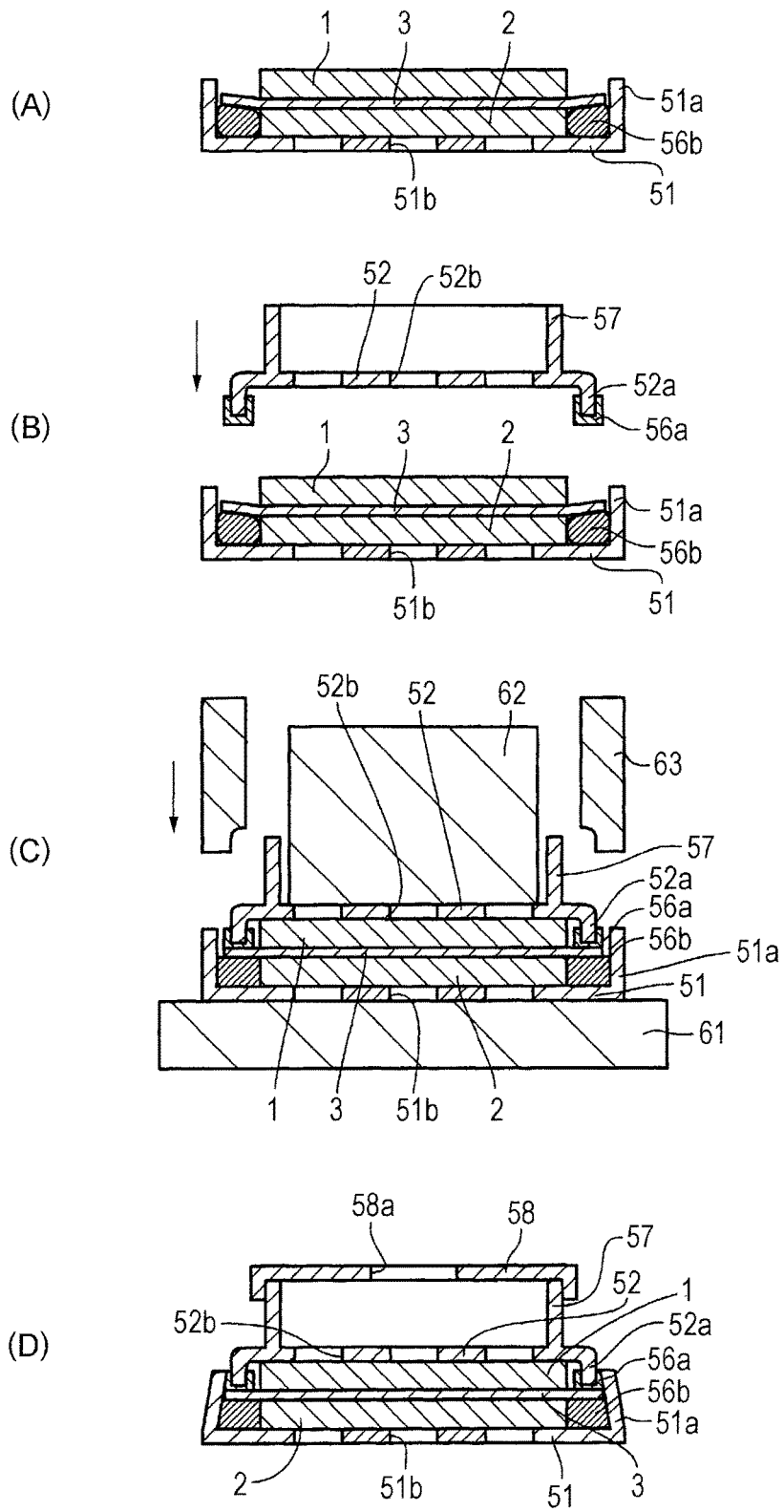
FIG. 29 is a schematic line diagram for describing a method for manufacturing the biofuel cell according to the third embodiment.

Next, an example of a method for manufacturing the biofuel cell will be described. FIG. 29 shows the manufacturing method.

As shown in FIG. 29(A), first, a cathode current collector 51 having a cylindrical shape with an open end is prepared. The cathode current collector 51 has a plurality of oxidizing agent supply ports 51b formed in the entire surface of the bottom face thereof. A ring-shaped hydrophobic resin 56b is placed on the outer peripheral portion of the inner bottom face of the cathode current collector 51, and a cathode 2, an electrolyte layer 3, and an anode 1 are sequentially stacked on the central portion of the bottom face.

Meanwhile, as shown in FIG. 29(B), an anode current collector 52 having a cylindrical shape with an open end and a fuel tank 57 formed integrally with the anode current collector 52 are prepared. The anode current collector 52 has a plurality of fuel supply ports 52b formed in the entire surface thereof. A gasket 56a having a U-shaped section is attached to the edge of the outer peripheral surface of the anode current collector 52. Furthermore, the anode current collector 52 is placed on the anode 1 so that the open end faces downward, and the cathode 2, the electrolyte layer 3, and the anode 1 are sandwiched between the cathode current collector 51 and the anode current collector 52.

Next, as shown in FIG. 29(C), the cathode current collector 51 and the anode current collector 52 with the cathode 2, the electrolyte layer 3, and the anode 1 sandwiched therebetween are placed on a base 61 of a caulking machine, and the anode current collector 52 is pressed with a pressing member 62 to bring the cathode current collector 51, the cathode 2, the electrolyte layer 3, the anode 1, and the anode current collector 52 into close contact with each other. In this state, a caulking tool 63 is moved downward to caulk the edge of an outer peripheral portion 51a of the cathode current collector 51 to an outer peripheral portion 52a of the anode current collector 52 with the gasket 56a and the hydrophobic resin 56b therebetween. This caulking is performed such that the gasket 56a is gradually crushed so as not to form a gap between the cathode current collector 51 and the gasket 56a and between the anode current collector 52 and the gasket 56a. Furthermore, in this case, the hydrophobic resin 56b is also gradually compressed so as to be brought into close contact with the cathode 2, the cathode current collector 51, and the gasket 56a. Consequently, a space for accommodating the cathode 2, the electrolyte layer 3, and the anode 1 is formed inside the cathode current collector 51 and the anode current collector 52 while the cathode current collector 51 and the anode current collector 52 are electrically insulated from each other due to the gasket 56a. The caulking tool 63 is then moved upward.

Thus, as shown in FIG. 29(D), the biofuel cell is manufactured in which the cathode 2, the electrolyte layer 3, and the anode 1 are accommodated in the space formed between the cathode current collector 51 and the anode current collector 52.

Next, a cover 58 is attached to the fuel tank 57, and a fuel and an electrolyte are injected through a fuel supply port 58a of the cover 58. The fuel supply port 58a is then closed by, for example, attaching a hermetic seal. However, the fuel and electrolyte may be injected into the fuel tank 57 in the step shown in FIG. 29(B).

In this biofuel cell, for example, when a glucose solution is used as the fuel to be charged into the fuel tank 57, at the anode 1, the supplied glucose is decomposed by an enzyme to produce electrons and to generate $H^+$. At the cathode 2, water is produced from $H^+$ transported from the anode 1 through the electrolyte layer 3, the electrons sent from the anode 1 through an external circuit, and oxygen in the air, for example. As a result, an output voltage is generated between the cathode current collector 51 and the anode current collector 52.

Figure 30:
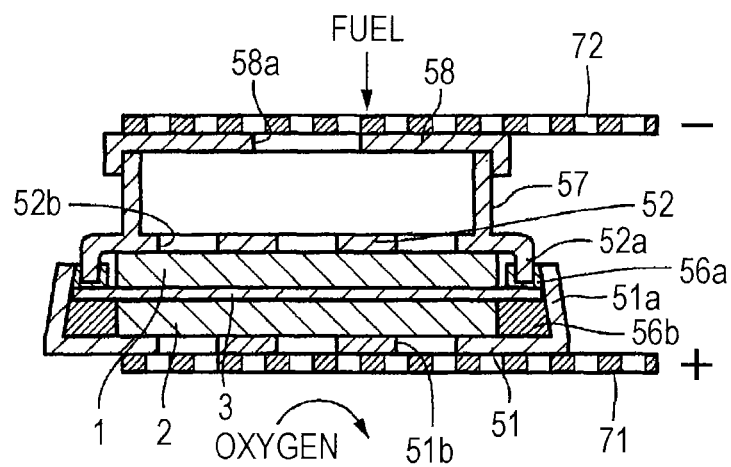
FIG. 30 is a schematic line diagram for describing a first usage example of the biofuel cell according to the third embodiment.

As shown in FIG. 30, mesh electrodes 71 and 72 may be formed on the cathode current collector 51 and the anode current collector 52 of this biofuel cell, respectively. In this case, outside air enters the oxidizing agent supply ports 51b of the cathode current collector 51 through holes of the mesh electrode 71, and a fuel enters the fuel tank 57 from the fuel supply port 58a of the cover 58 through holes of the mesh electrode 72.

Figure 31:
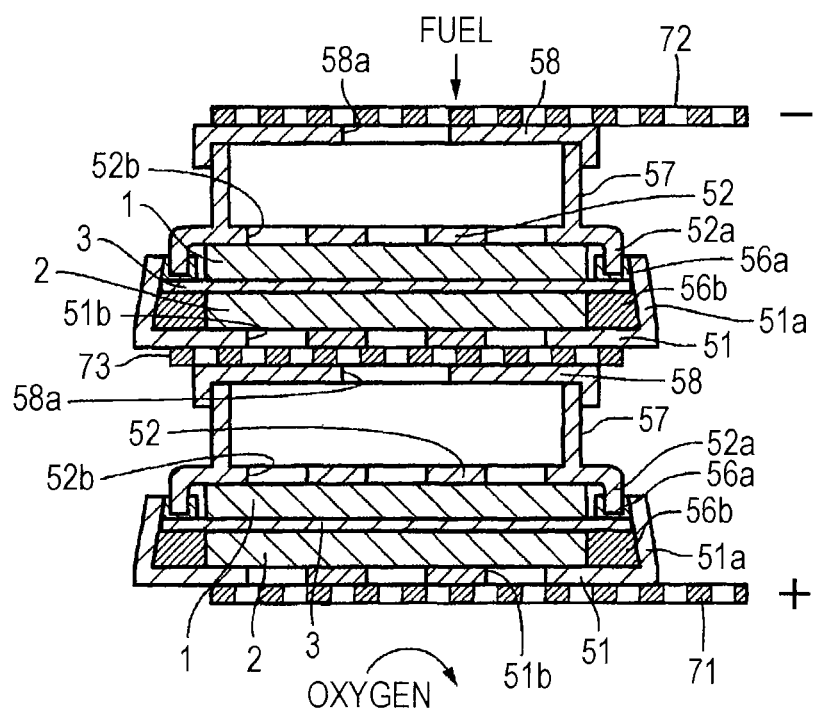
FIG. 31 is a schematic line diagram for describing a second usage example of the biofuel cell according to the third embodiment.

FIG. 31 shows the case in which two biofuel cells are connected to each other in series. In this case, a mesh electrode 73 is sandwiched between the cathode current collector 51 of one of the biofuel cells (in the drawing, the upper biofuel cell) and the cover 58 of the other of the biofuel cells (in the drawing, the lower biofuel cell). In this case, outside air enters the oxidizing agent supply ports 51b of the cathode current collector 51 through holes of the mesh electrode 73. A fuel can also be supplied using a fuel supply system.

Figure 32:
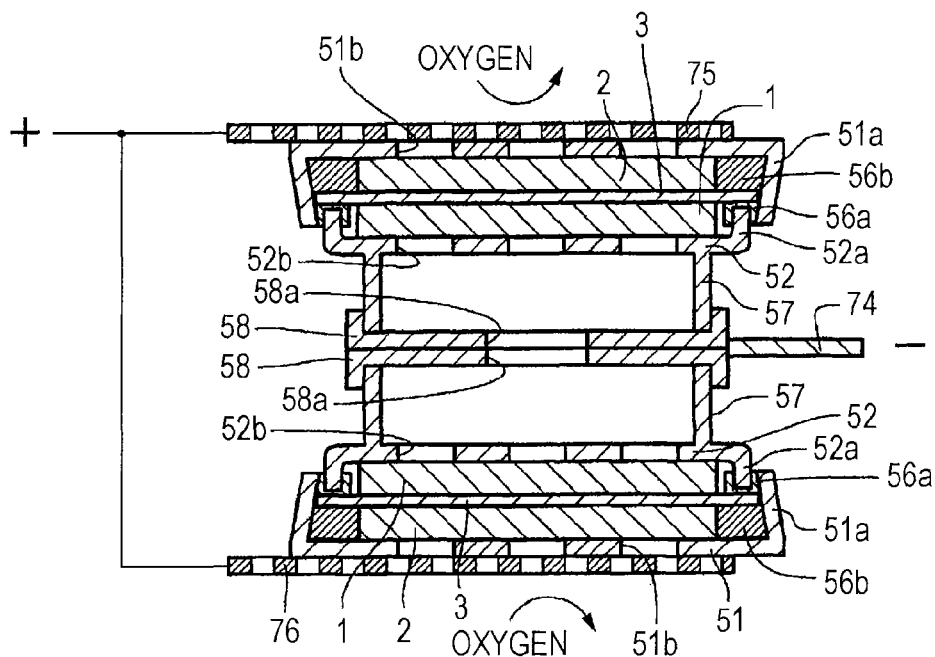
FIG. 32 is a schematic line diagram for describing a third usage example of the biofuel cell according to the third embodiment.

FIG. 32 shows the case in which two biofuel cells are connected in parallel. In this case, the fuel tank 57 of one of the biofuel cells (in the drawing, the upper biofuel cell) and the fuel tank 57 of the other of the biofuel cells (in the drawing, the lower biofuel cell) are brought into contact with each other so that the fuel supply ports 58a of the covers 58 coincide with each other, and an electrode 74 is drawn from the side faces of these fuel tanks 57. In addition, mesh electrodes 75 and 76 are formed on the cathode current collector 51 of one of the biofuel cells and the cathode current collector 51 of the other of the biofuel cells, respectively. These mesh electrodes 75 and 76 are connected to each other. Outside air enters the oxidizing agent supply ports 51b of the cathode current collectors 51 through holes of the mesh electrodes 75 and 76.

According to the third embodiment, the same advantages as those of the first embodiment can be achieved in a coin-type or button-type biofuel cell excluding the fuel tank 57. Furthermore, in this biofuel cell, the cathode 2, the electrolyte layer 3, and the anode 1 are sandwiched between the cathode current collector 51 and the anode current collector 52, and the edge of the outer peripheral portion 51a of the cathode current collector 51 is caulked to the outer peripheral portion 52a of the anode current collector 52 with the gasket 56a therebetween. Accordingly, in this biofuel cell, the individual components can be uniformly brought into close contact with each other, whereby a variation in output can be prevented and the leakage of cell solutions such as the fuel and the electrolyte from the interfaces between the individual components can also be prevented. In addition, this biofuel cell is manufactured in a simple manufacturing process. Moreover, this biofuel cell is easily reduced in size. Furthermore, in this biofuel cell, a glucose solution or starch is used as a fuel, and about pH 7 (neutrality) is selected as the pH of the electrolyte used. Accordingly, the safety is ensured even if the fuel or the electrolyte leaks to the outside.

Furthermore, in air cells that are currently put into practical use, a fuel and an electrolyte needs to be added during the manufacturing, and thus it is difficult to add a fuel and an electrolyte after the manufacturing. In contrast, in this biofuel cell, since a fuel and an electrolyte can be added after the manufacturing, the biofuel cell can be manufactured more easily than the air cells that are currently put into practical use.

Next, a biofuel cell according to a fourth embodiment will be described.

Figure 33:
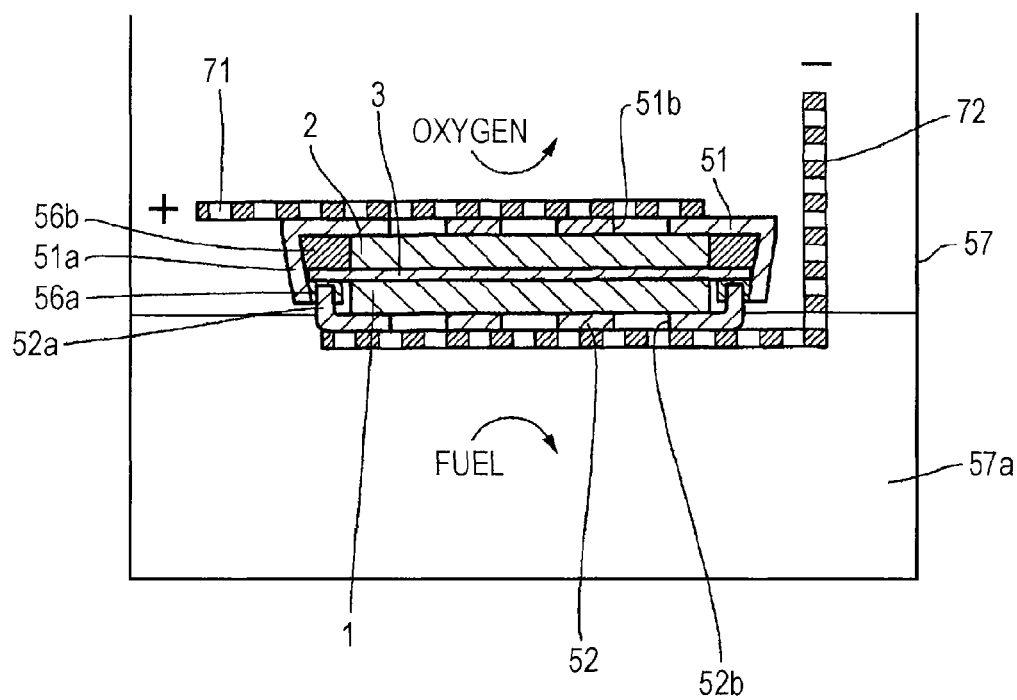
FIG. 33 is a schematic line diagram showing a biofuel cell according to a fourth embodiment and the usage thereof.

As shown in FIG. 33, in the fourth embodiment, the fuel tank 57 provided integrally with the anode current collector 52 is removed from the biofuel cell according to the third embodiment. In addition, the mesh electrodes 71 and 72 are formed on the cathode current collector 51 and the anode current collector 52, respectively. The biofuel cell is used in a state in which the biofuel cell floats on a fuel 57a contained in an open fuel tank 57 so that the anode 1 faces downward and the cathode 2 faces upward.

The configuration of the fourth embodiment other than the above-described configuration is the same as those of the first and third embodiments as long as the nature thereof is not impaired.

According to the fourth embodiment, the same advantages as those of the first and third embodiments can be achieved.

Next, a biofuel cell according to a fifth embodiment will be described. The biofuel cell according to the third embodiment is a coin type or a button type whereas this biofuel cell is a cylindrical type.

Figure 34:
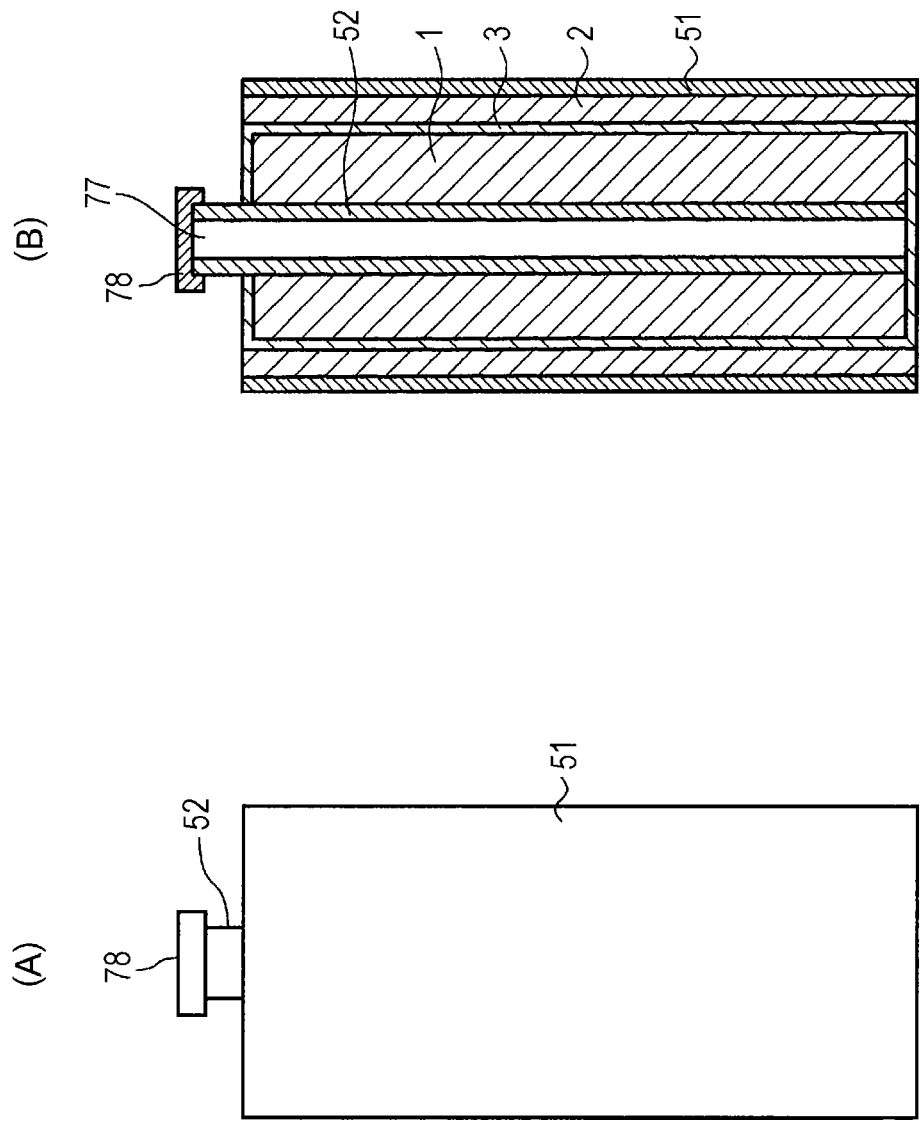
FIG. 34 includes a front view and a longitudinal sectional view that show a biofuel cell according to a fifth embodiment.
Figure 35:
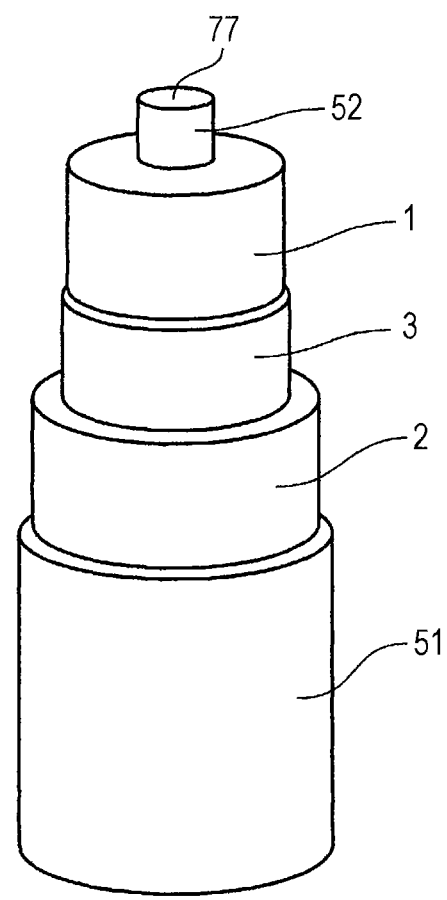
FIG. 35 is an exploded perspective view showing the biofuel cell according to the fifth embodiment.

FIGS. 34 and 35 show this biofuel cell. FIG. 34(A) is a front view of the biofuel cell, FIG. 34(B) is a longitudinal sectional view of the biofuel cell, and FIG. 35 is an exploded perspective view showing exploded individual components of the biofuel cell.

As shown in FIGS. 34 and 35, in this biofuel cell, an anode current collector 52, an anode 1, an electrolyte layer 3, a cathode 2, and a cathode current collector 51, each of which has a cylindrical shape, are sequentially disposed on the outer periphery of a columnar fuel storage portion 77. In this case, the fuel storage portion 77 is constituted by a space surrounded by the cylindrical anode current collector 52. One end of the fuel storage portion 77 projects outward, and a cover 78 is disposed on the one end. Although not shown in the drawing, a plurality of fuel supply ports 52b are formed in the entire surface of the anode current collector 52 disposed on the outer periphery of the fuel storage portion 77. In addition, the electrolyte layer 3 has a bag shape that wraps the anode 1 and the anode current collector 52. The portion between the electrolyte layer 3 and the anode current collector 52 at the one end of the fuel storage portion 77 is sealed with, for example, a sealing member (not shown) so that a fuel does not leak to the outside from this portion.

In this biofuel cell, a fuel and an electrolyte are charged into the fuel storage portion 77. The fuel and the electrolyte pass through the fuel supply ports 52b of the anode current collector 52, reach the anode 1, and infiltrate into pore portions of the anode 1, whereby the fuel and the electrolyte are stored in the anode 1. To increase the amount of fuel that can be stored in the anode 1, the porosity of the anode 1 is desirably, for example, 60% or more, but is not limited thereto.

In this biofuel cell, a gas-liquid separation layer may be formed on the outer peripheral surface of the cathode current collector 51 to improve durability. As the material for the gas-liquid separation layer, for example, a waterproof moisture-permeable material (a composite material of a stretched polytetrafluoroethylene film and a polyurethane polymer) (e.g., Gore-Tex (trade name) manufactured by WL Gore & Associates, Inc.) is used. To uniformly bring the individual components of the biofuel cell into close contact with each other, preferably, stretchable rubber (which may have a band-like or sheet-like shape) having a mesh structure through which air can pass from the outside is wound outside or inside the gas-liquid separation layer so that the whole components of the biofuel cell are fastened.

The configuration of the fifth embodiment other than the above-described configuration is the same as those of the first and third embodiments as long as the nature thereof is not impaired.

According to the fifth embodiment, the same advantages as those of the first and third embodiments can be achieved.

Next, a biofuel cell according to a sixth embodiment will be described.

This biofuel cell uses starch, which is a polysaccharide, as a fuel. In addition, in association with the use of starch as the fuel, glucoamylase, which is a catabolic enzyme that decomposes starch into glucose, is also immobilized on an anode 1.

In this biofuel cell, when starch is supplied as the fuel to the anode 1 side, the starch is hydrolyzed into glucose by glucoamylase, and the glucose is decomposed by glucose dehydrogenase. Furthermore, $NAD^+$ is reduced to NADH with an oxidation reaction in this decomposition process, and the NADH is oxidized by diaphorase to be separated into two electrons, $NAD^+$, and $H^+$. Thus, two electrons and two $H^+$ are generated per glucose molecule through a single step of oxidation reaction. Four electrons and four $H^+$ are generated in total through two steps of oxidation reaction. The electrons thus produced are transferred to the electrode 11 of the anode 1, and $H^+$ moves to the cathode 2 through the electrolyte layer 3. At the cathode 2, the $H^+$ reacts with oxygen supplied from the outside and electrons sent from the anode 1 through an external circuit to generate $H_2O$.

The configuration other than the above-described configuration is the same as that of the biofuel cell according to the first embodiment.

According to the sixth embodiment, the same advantage as that of the first embodiment can be achieved. In addition, since starch is used as the fuel, it is possible to achieve an advantage in that the amount of electric power generated can be increased compared with the case where glucose is used as a fuel.

Next, a biofuel cell according to a seventh embodiment will be described.

In this biofuel cell, water repellency is imparted by applying a water-repellent agent prepared by dispersing polyvinyl butyral, which is a water-repellent polymer, in an organic solvent to the surface of an electrode on which an enzyme and the like are immobilized with PLL when the cathode 2 is produced in the biofuel cell according to the first embodiment. The configuration other than the above-described configuration is the same as that of the biofuel cell according to the first embodiment.

Figure 36:
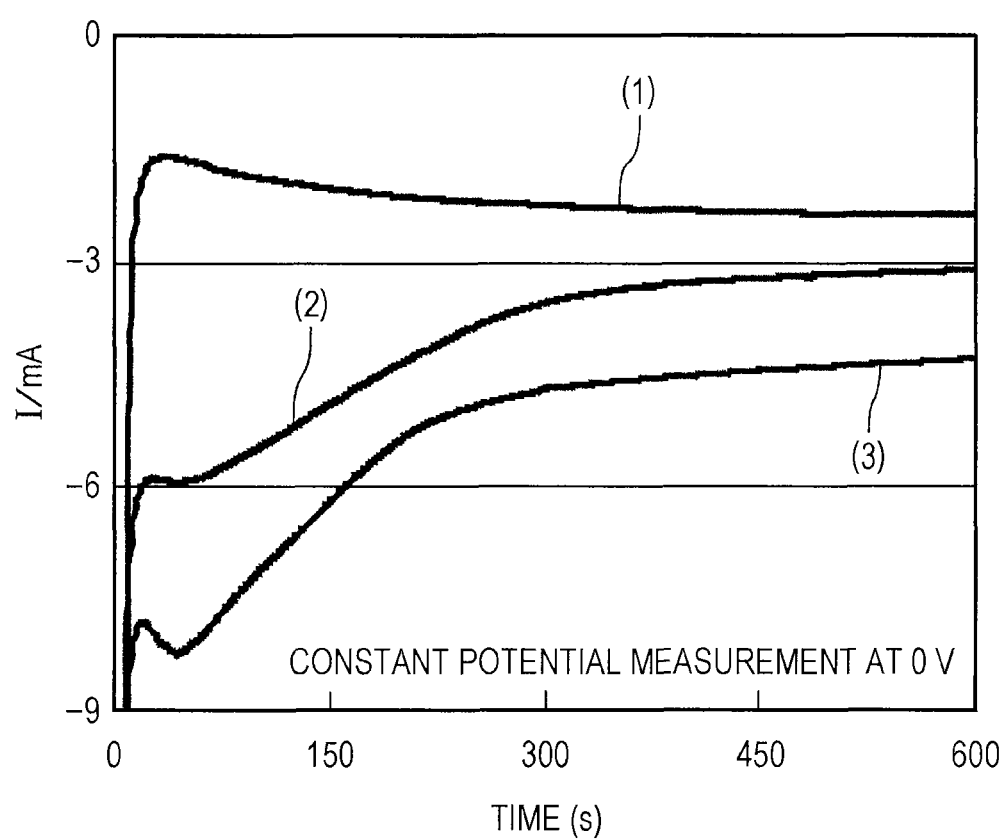
FIG. 36 is a schematic line diagram showing the measurement results of chronoamperometry performed on biofuel cells according to seventh and eighth embodiments.

FIG. 36 shows the evaluation result of the cathode 2 of this biofuel cell (curved line (2)) together with that of Comparative Example (curved line (1)). The biofuel cell used for the measurement was a soaking type biofuel cell that uses a nonwoven fabric as the electrolyte layer 3, and a 2.0 M imidazole/hydrochloric acid buffer solution (pH 7) was used as the buffer solution.

In Comparative Example, an enzyme/electron mediator-immobilized electrode prepared as follows was used as the cathode 2. First, a commercially available carbon felt (BO050 manufactured by TORAY Industries Inc.) was prepared as porous carbon, and this carbon felt was cut into a one-centimeter square, two of which were placed on top of another. Next, the carbon felt was sequentially impregnated with 80 µl of hexacyanoferrate ions (50 mM, solvent: water), 80 µl of poly-L-lysine (2 wt %, solvent: water), and 80 µl of a BOD solution (50 mg/ml, 50 mM phosphoric acid/sodium hydroxide buffer solution, pH 7), and then dried. On the other hand, in the sixth embodiment, 80 µl of polyvinyl butyral (the degree of polymerization: 1000) (2 wt %, solvent: methyl isobutyl ketone), which is a water-repellent polymer, was added to the above-described enzyme/electron mediator-immobilized electrode of Comparative Example and then dried to produce the cathode 2. As is clear from FIG. 36, in the seventh embodiment, a large current is generated for a long time compared with Comparative Example.

According to the seventh embodiment, the same advantage as that of the first embodiment can be achieved.

Next, a biofuel cell according to an eighth embodiment will be described.

In this biofuel cell, water repellency is imparted by immobilizing an enzyme and the like on the surface of an electrode and then applying a water-repellent agent prepared by dispersing polyvinyl butyral, which is a water-repellent polymer, in an organic solvent when the cathode 2 is produced in the biofuel cell according to the first embodiment. The configuration other than the above-described configuration is the same as that of the biofuel cell according to the first embodiment.

FIG. 36 shows the evaluation result of the cathode 2 of this biofuel cell (curved line (3)). The biofuel cell used for the measurement was a soaking type biofuel cell that uses a nonwoven fabric as the electrolyte layer 3, and a 2.0 M imidazole/hydrochloric acid buffer solution (pH 7) was used as the buffer solution.

In the eighth embodiment, an enzyme/electron mediator-immobilized electrode prepared as follows was used as the cathode 2. First, a commercially available carbon felt (BO050 manufactured by TORAY Industries Inc.) was prepared as porous carbon, and this carbon felt was cut into a one-centimeter square, two of which were placed on top of another. Next, the carbon felt was sequentially impregnated with 80 µl of hexacyanoferrate ions (50 mM, solvent: water) and 80 µl of a BOD solution (50 mg/ml, 50 mM phosphoric acid/sodium hydroxide buffer solution, pH 7), and then dried. Subsequently, 80 µl of polyvinyl butyral (the degree of polymerization: 1000) (2 wt %, solvent: methyl isobutyl ketone), which is a water-repellent polymer, was added to the thus-obtained enzyme/electron mediator-immobilized electrode and then dried. As is clear from FIG. 36, in the eighth embodiment, a large current is continuously generated for a long time compared with Comparative Example, and additionally a current larger than that of the seventh embodiment is generated.

According to the eighth embodiment, the same advantage as that of the first embodiment can be achieved.

The numerical values, structures, configurations, shapes, materials, and the like described in the above embodiments are mere examples, and other numerical values, structures, configurations, shapes, materials, and the like that are different from the above may be optionally used.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:
1. A fuel cell comprising:
a cathode;
an anode facing the cathode; and
a proton conductor formed between the anode and the cathode,
wherein the cathode consists of
a framework consisting of a porous carbon material, at least one type of enzyme and an electron mediator are immobilized on an outer surface of the cathode, and
a water-repellent agent impregnated in the cathode and provided both on the outer surface of the cathode on which the enzyme is immobilized and on inner surfaces of pores inside the cathode, and wherein the enzyme is active when the water-repellent agent is contained on the outer surface of the cathode.

2. The fuel cell according to claim 1, wherein the porous carbon material is selected from the group consisting of: porous carbon, carbon pellet, carbon felt and carbon paper.

3. The fuel cell according to claim 1, wherein the porous carbon material is selected from the group consisting of: porous carbon, carbon pellet, carbon felt and carbon paper, and the water-repellent agent comprises a carbon powder provided both on the outer surface of cathode on which the enzyme is immobilized and on the inner surfaces of the pores inside the cathode.

4. The fuel cell according to claim 1, wherein the water-repellent agent comprises particles having a size smaller than the pores of the cathode.

5. The fuel cell according to claim 1, wherein the water-repellent agent comprises at least one selected from the group consisting of: polyvinyl butyral and polyvinylidene fluoride.

6. The fuel cell according to claim 1, wherein the water-repellent agent comprises a binder and a water-repellent material selected from the group consisting of: a carbon powder, polyvinyl butyral, polyvinylidene fluoride, a tetrafluoroethylene-hexafluoropropylene copolymer, polytetrafluoroethylene, a tetrafluoroethylene-perfluoroalkyl vinyl ether copolymer, polyvinyl fluoride, a perfluoroalkoxy resin, a tetrafluoroethylene-ethylene copolymer, polychlorotrifluoroethylene, and polyethersulfone.

7. The fuel cell according to claim 1, wherein the water-repellent agent comprises a binder and a content of the binder in the water-repellent agent ranges from 0.01 weight percent to 10 weight percent.

8. The fuel cell according to claim 1, wherein the proton conductor is composed of a nonwoven fabric.

9. The fuel cell according to claim 1, wherein the water-repellent agent is provided on at least part of the outer surface of the cathode using a dispersion containing the water-repellent agent and an organic solvent that causes phase separation with water, and wherein the enzyme comprises bilirubin oxidase and the organic solvent is selected from the group consisting of: methyl isobutyl ketone, heptane, hexane, toluene, isooctane and diethyl ether.

10. The fuel cell according to claim 1, wherein the enzyme includes an oxygen reductase.

11. The fuel cell according to claim 10, wherein the oxygen reductase is a bilirubin oxidase.

12. The fuel cell according to claim 1, wherein the water-repellent agent comprises a carbon powder.

13. The fuel cell according to claim 12, wherein the carbon powder is selected from the group consisting of: graphite, activated carbon, a vapor grown carbon fiber and Ketjenblack.

14. The fuel cell according to claim 1, wherein the water-repellent agent is provided on at least part of the outer surface of the cathode using a dispersion containing the water-repellent agent and an organic solvent that causes phase separation with water, and wherein the organic solvent is one in which the solubility of the enzyme is 10 mg/ml or less.

15. The fuel cell according to claim 14, wherein the organic solvent is selected from the group consisting of: methyl isobutyl ketone, heptane, hexane, toluene, isooctane and diethyl ether.

16. The fuel cell according to claim 1, wherein a fuel solution is in contact with part of the cathode.

17. The fuel cell according to claim 16, wherein the fuel solution is in contact with an outer peripheral surface of the anode and a side surface of the cathode.

18. The fuel cell according to claim 17, wherein a sheet composed of a material that passes air but does not pass the fuel solution is disposed on the outer surface of the cathode, the outer surface being opposite the proton conductor.

* * * * *